United States Patent
Tamura et al.

[19]

[11] Patent Number: 5,974,009
[45] Date of Patent: Oct. 26, 1999

[54] FOCUS CONTROL DEVICE AND METHOD FOR USE IN MULTILAYER OPTICAL DISK REPRODUCTION SYSTEM

[75] Inventors: Masayuki Tamura, Fukaya; You Yoshioka, Yokohama, both of Japan

[73] Assignee: Kabushiki Kaisha Toshiba, Kawasaki, Japan

[21] Appl. No.: 08/959,204

[22] Filed: Oct. 28, 1997

[30] Foreign Application Priority Data

Oct. 29, 1996 [JP] Japan ..................................... 8-286722

[51] Int. Cl.⁶ ....................................................... G11B 7/09
[52] U.S. Cl. ................................... 369/44.29; 369/44.27; 369/44.25; 369/94; 250/201.5
[58] Field of Search .............................. 369/44.27, 44.25, 369/44.28, 44.29, 44.34, 44.35, 44.37, 44.41, 44.11, 44.22, 44.24, 44.26, 47, 48, 54, 112, 94; 250/201.5

[56] References Cited

U.S. PATENT DOCUMENTS

5,263,011 11/1993 Maeda et al. ......................... 369/44.27
5,682,372 10/1997 Yamakawa et al. ................ 369/112 X

*Primary Examiner*—Muhammad Edun
*Attorney, Agent, or Firm*—Pillsbury Madison & Sutro, LLP

[57] ABSTRACT

In making a layer jump or focus search on a multilayer optical disk having two or more signal recorded layers, an objective lens is moved in a focusing direction to focus a laser beam onto a desired signal recorded layer with focus servo kept OFF. Based on the number of times a focus error signal having an S-shaped characteristic obtained as a result of driving the objective lens exceeds a predetermined voltage level, arrival at the desired signal recorded layer is determined. In this state, the focus servo is made active at the time when the focus error signal first goes to the 0 level.

11 Claims, 16 Drawing Sheets

FIG. 11A  FOCUS ERROR SIGNAL

FIG. 11B  RESULT OF COMPARISON BETWEEN FOCUS ERROR SIGNAL AND F1

FIG. 11C  RESULT OF COMPARISON BETWEEN FOCUS ERROR SIGNAL AND 0 LEVEL

FIG. 11D  KICK CONTROL PULSE

FIG. 11E  KICK PULSE

FIG. 11F  OBJECTIVE LENS POSITION

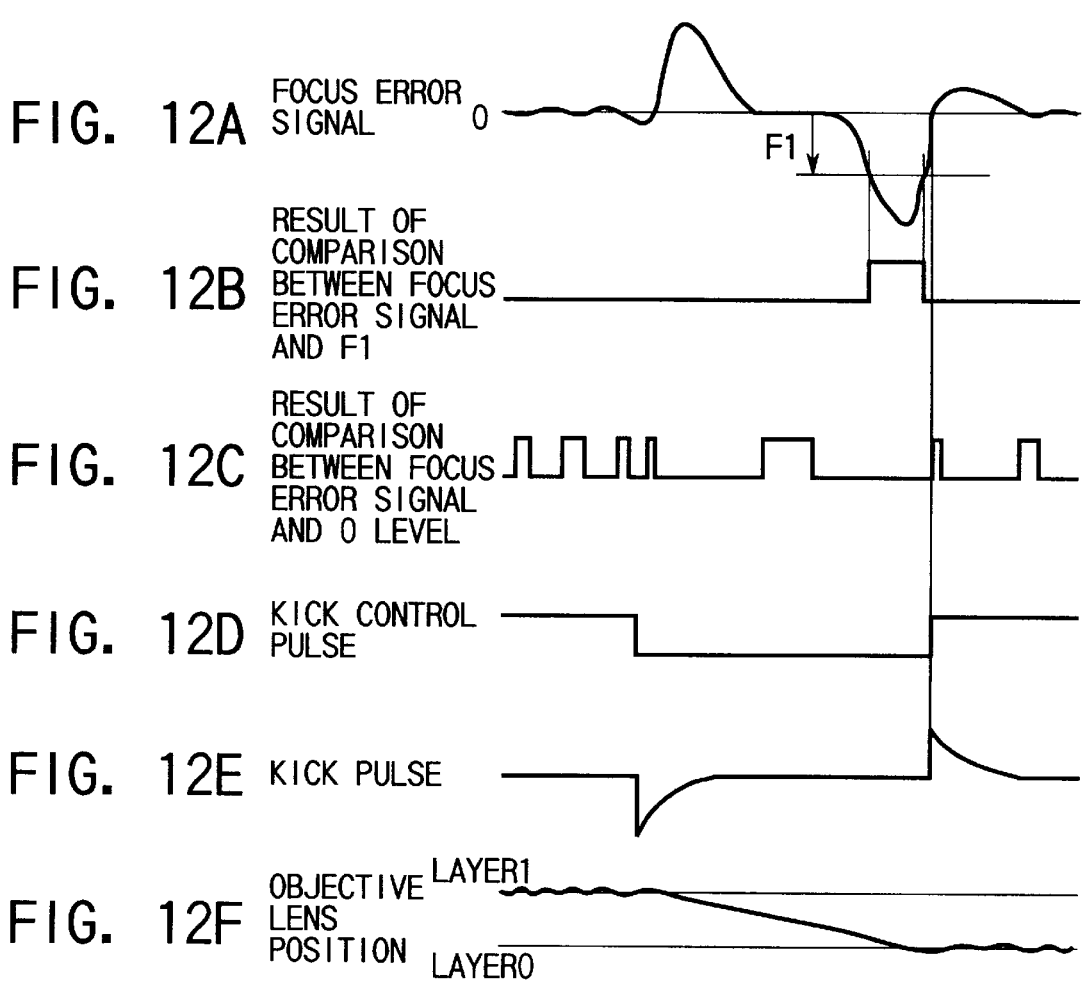
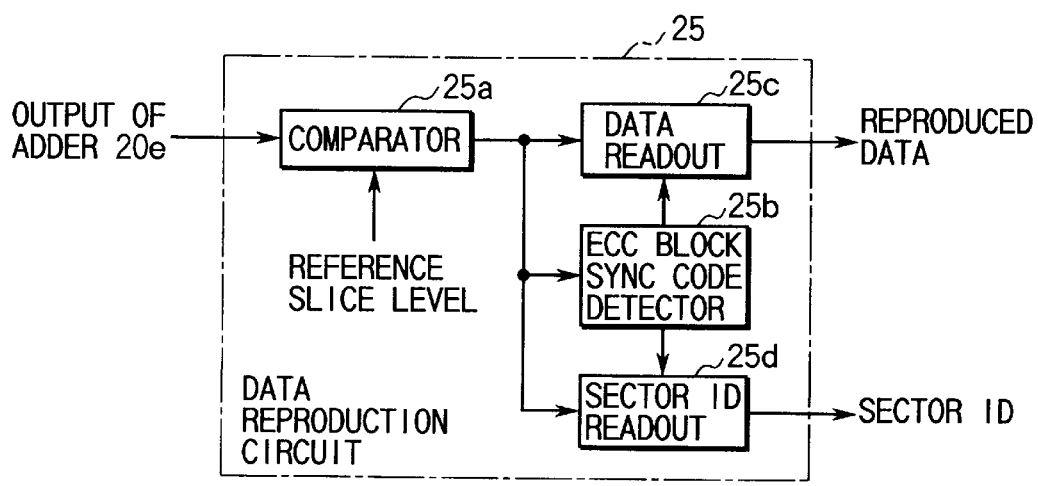
FIG. 13

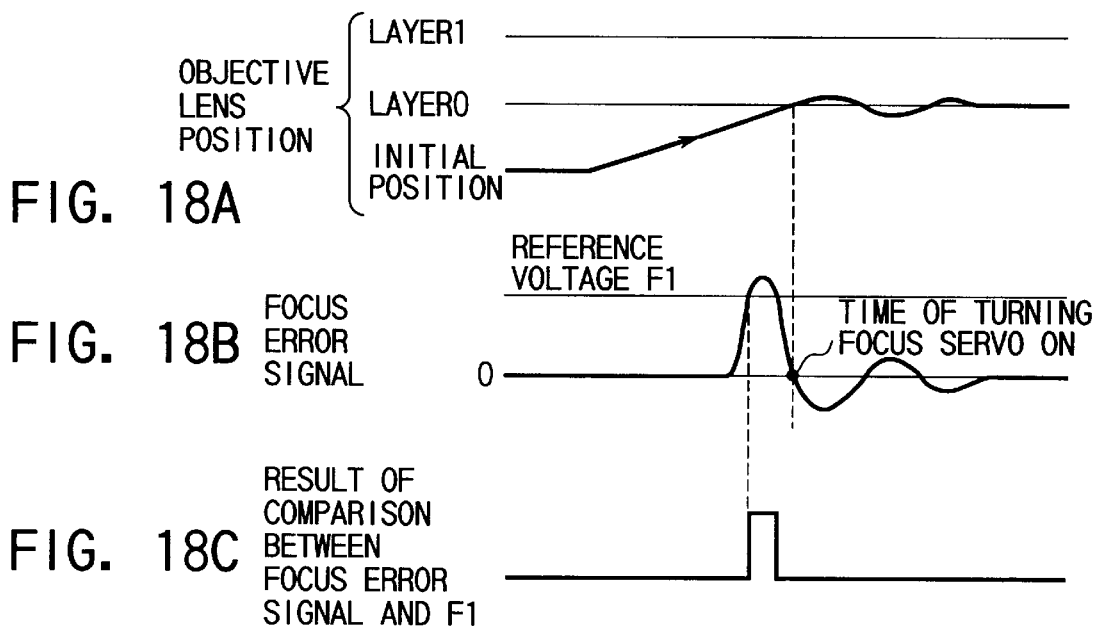
FIG. 18A
FIG. 18B
FIG. 18C
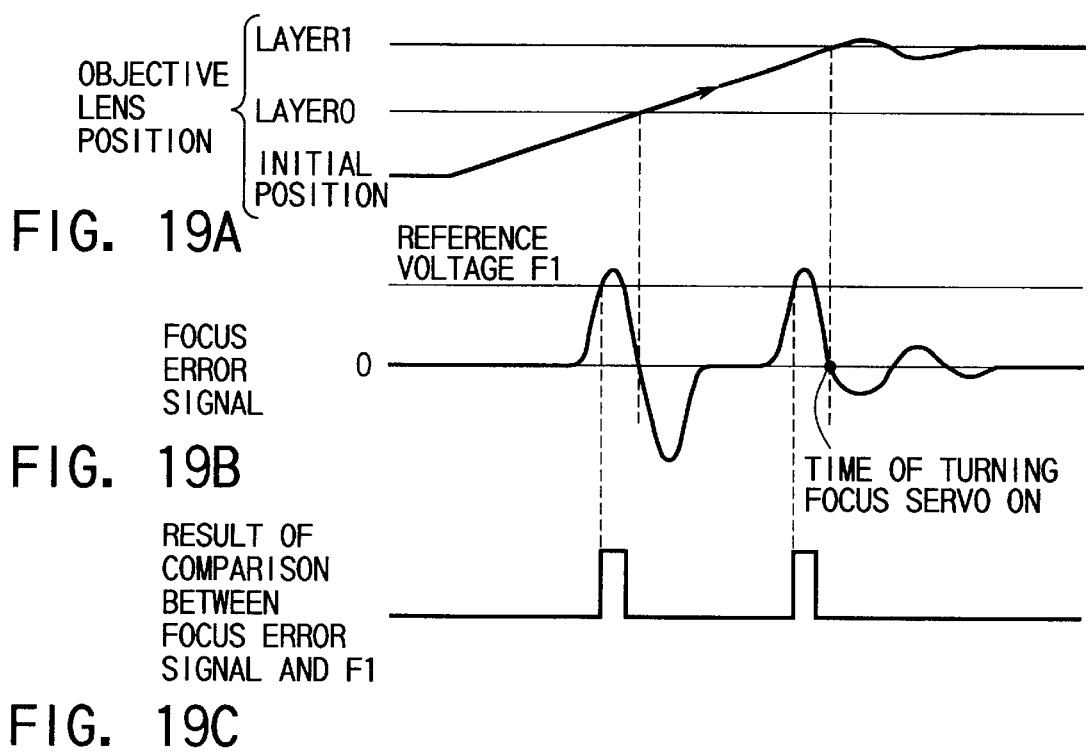
FIG. 19A
FIG. 19B
FIG. 19C

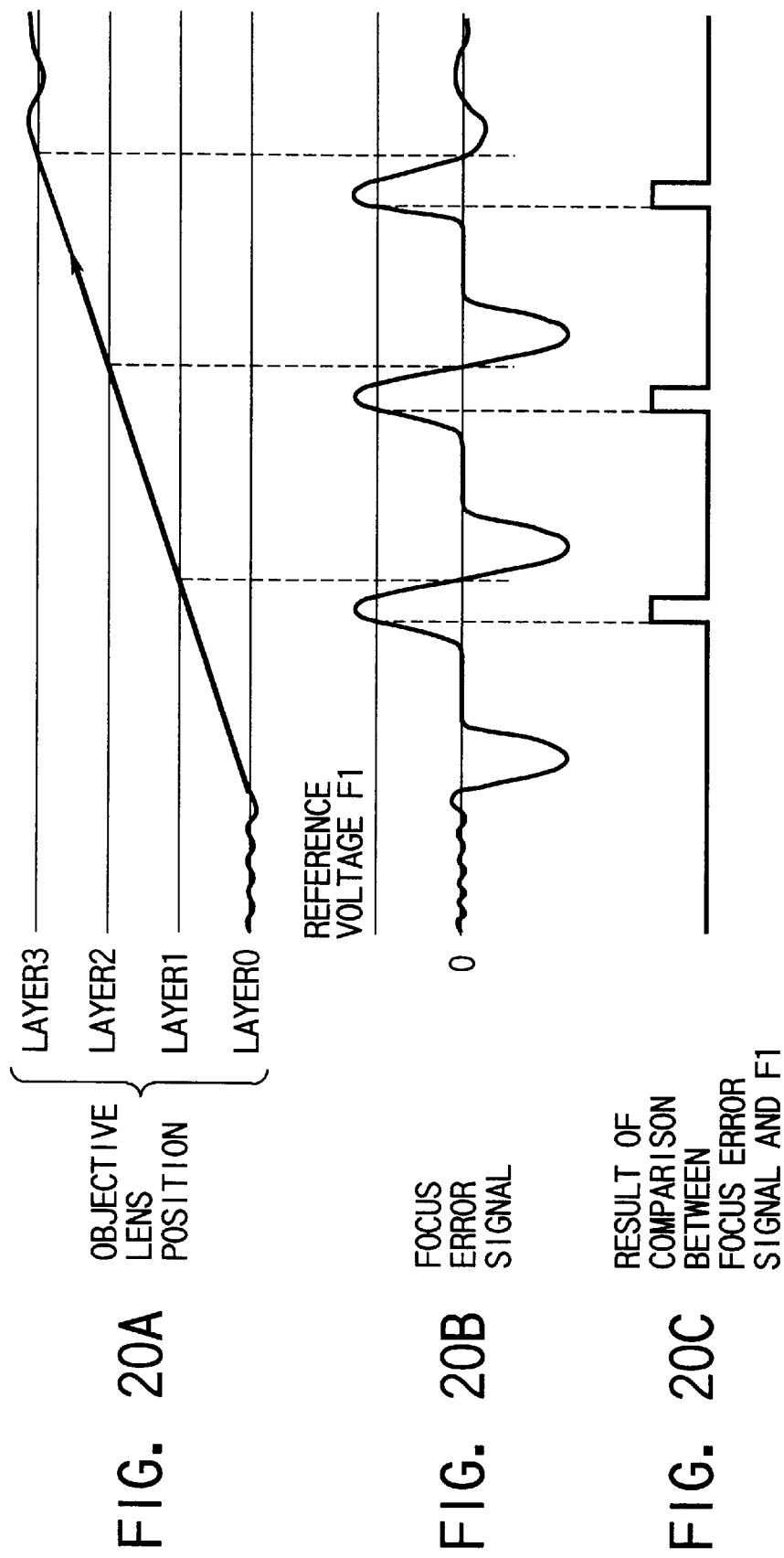

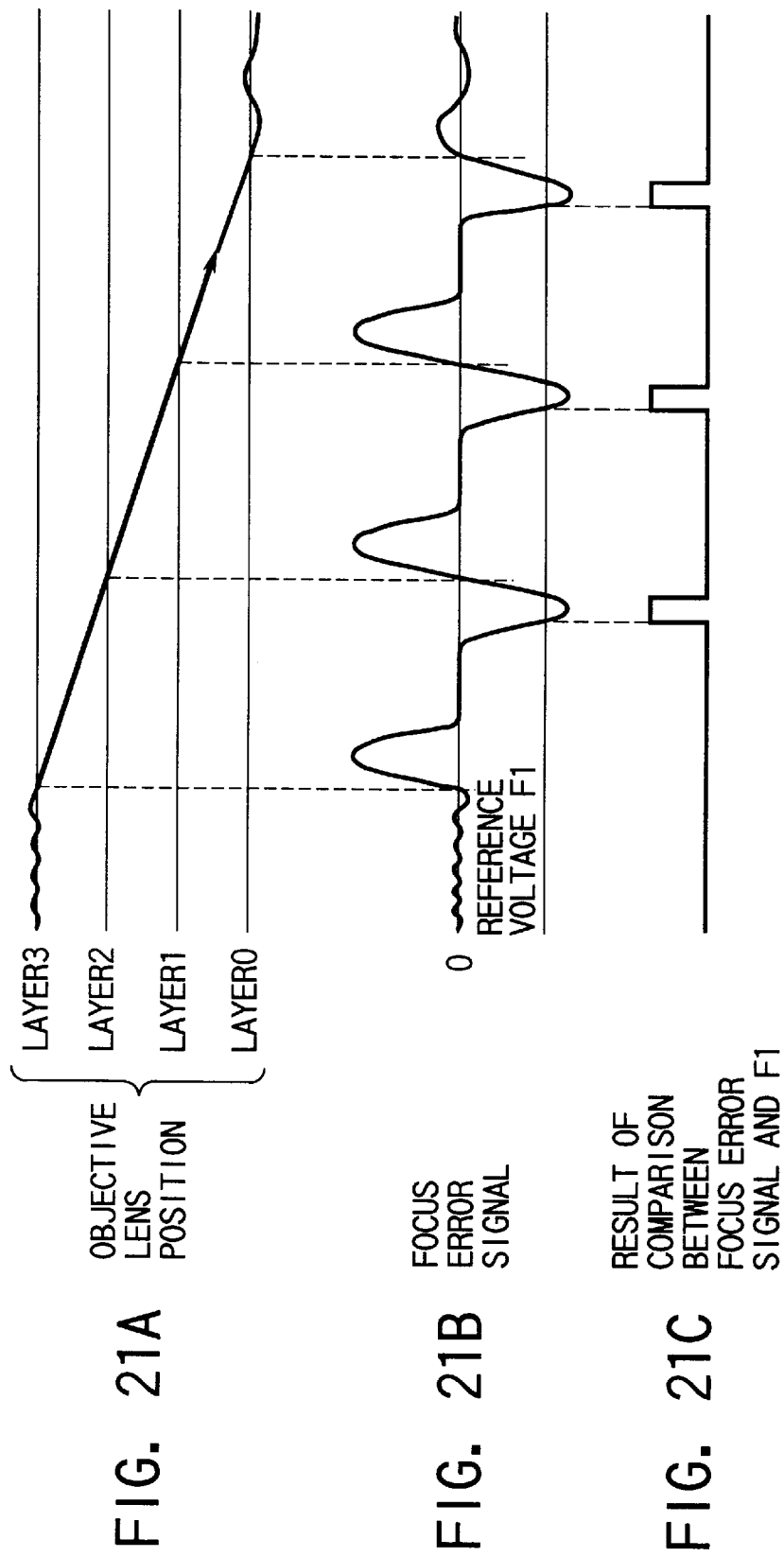

FOCUS CONTROL DEVICE AND METHOD FOR USE IN MULTILAYER OPTICAL DISK REPRODUCTION SYSTEM

BACKGROUND OF THE INVENTION

The present invention relates to a multilayer optical disk reproduction system for reproducing multilayer optical disks having two or more signal recorded layers, and more specifically to improvements in a focus control device and method for selectively performing focus servo on the signal recorded layers.

As is well known, a type of optical disk, called a DVD (Digital Video Disk), has been developed and put into practical use in recent years. This DVD, which is 12 cm in diameter as is the music compact disk (CD), can be recorded on its one side with more than five gigabytes of digital data.

For this reason, it is expected that the DVD will be widely used in various fields as a large-volume storage medium. With the DVD, a further increase in recording capacity can be achieved by sticking a plurality of disks each with a signal recording layer together into multilayer structure.

In an optical disk playback system adapted to reproduce such a multilayer DVD, focus servo is performed on the objective lens so that a laser beam is focused onto a signal recorded layer on which, of multiple signal recorded layers, a reproduction request is made, thereby reading data recorded on that layer.

Suppose here that, when focus servo is being performed on a specific signal recorded layer, a request is made for playing back another signal recorded layer. In such a case, in order to perform focus servo on the target signal recorded layer, it is required that the multilayer optical disk reproduction system be equipped with what is called a layer jump function to automatically control the position of the objective lens.

Also, suppose that, when none of the signal recorded layers is played back, that is, when the objective lens is placed in its initial position, a request is made for playing back a desired signal recorded layer. In order to perform focus servo on that signal recorded layer, it is required for the multilayer optical disk reproduction system to be equipped with a focus search function that allows the position of the objective lens to be controlled automatically.

BRIEF SUMMARY OF THE INVENTION

It is therefore an object of the present invention to provide a focus control device and method for use in a multilayer optical disk reproduction system which permits the position of the objective lens to be controlled automatically so that focus servo will be performed rapidly and reliably on a desired signal recorded layer of a multilayer optical disk.

According to an aspect of the present invention there is provided a focus control device for use in a multilayer optical disk reproduction system comprising: an objective lens for focusing a beam of light onto one side of a multilayer optical disk having a stack of multiple signal recorded layers; focusing means for moving the objective lens in a focusing direction so that the beam of light will be focused onto one of the signal recorded layers; photodetector means for detecting reflected light from a signal recorded layer onto which the beam of light is substantially focused; focus error signal producing means responsive to an output signal from the photodetector means for producing a focus error signal representing an out of focus condition of the objective lens on the signal recorded layer; focus servo means responsive to the focus error signal produced by the focus error signal producing means for controlling the focusing means to move the objective lens so that the light beam is focused on the signal recorded layer; moving means responsive to a movement signal in place of the focus error signal for controlling the focusing means to move the objective lens in a focusing direction; layer detecting means for, in a state where the objective lens is being moved by the movement means in a focusing direction, detecting the number of signal recorded layers transited by the focal point of the objective lens on the basis of an S-shaped characteristic of the focus error signal produced by the focus error signal producing means; and control means for, when the number of signal recorded layers detected by the layer detecting means reaches a given value and the focus error signal indicates an in-focus value, controlling the focusing means in response to the focus error signal in place of the movement signal.

According to the other aspect of the present invention there is provided a focus control method for use with a multilayer optical disk reproduction system comprising: an objective lens for focusing a beam of light onto one side of a multilayer optical disk having a stack of multiple signal recorded layers; focusing means for moving the objective lens in a focusing direction so that the beam of light will be focused onto one of the signal recorded layers; photodetector means for detecting reflected light from a signal recorded layer onto which the beam of light is substantially focused; focus error signal producing means responsive to an output signal from the photodetector means for producing a focus error signal representing an out of focus condition of the objective lens on the signal recorded layer; and focus servo means responsive to the focus error signal produced by the focus error signal producing means for controlling the focusing means to move the objective lens so that the light beam is focused on the signal recorded layer, which method comprises the steps of: controlling the focusing means to move the objective lens in a focusing direction in response to a movement signal in place of the focus error signal; detecting the number of signal recorded layers transited by the focal point of the objective lens on the basis of an S-shaped characteristic of the focus error signal produced by the focus error signal producing means in a state where the objective lens is being moved by the moving means in a focusing direction; and controlling the focusing means in response to the focus error signal in place of the movement signal when the number of signal recorded layers detected by the layer detecting means reaches a given value and the focus error signal indicates an in-focus value.

According to the arrangement and method as described above, in making a layer jump or focus search on the multilayer optical disk, the objective lens is moved by a move signal in a focusing direction to focus on a target signal recorded layer. The use of the S-shaped characteristic of the focus error signal that is obtained as a result of movement of the objective lens allows the detection of the focal point of the objective lens having arrived at the target signal recorded layer. Upon detection, the focus servo is enabled (turned ON).

For this reason, for a layer jump or focus search on a multilayer optical disk, the position of the objective lens can be controlled automatically to detect a target signal recorded layer rapidly and reliably and enable the focus servo. Thus, selective reproduction of data from each signal recorded layer can be performed readily.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIGS. 11A through 11F are diagrams for use in explanation of a layer jump operation from layer 0 to layer 1;

FIGS. 12A through 12F are diagrams for use in explanation of a layer jump operation from layer 1 to layer 0;

FIG. 13 is a block diagram of the data reproduction circuit of FIG. 1;

FIGS. 18A, 18B and 18C are diagrams for use in explanation of a focus search operation from the objective lens initial position to layer 0 in the reproduction system of FIG. 1;

FIGS. 19A, 19B and 19C are diagrams for use in explanation of a focus search operation from the objective lens initial position to layer 1 in the reproduction system of FIG. 1;

FIGS. 20A, 20B and 20C are diagrams for use in explanation of a layer jump operation from layer 0 to layer 3 of a four-layer optical disk in the reproduction system of FIG. 1;

FIGS. 21A, 21B and 21C are diagrams for use in explanation of a layer jump operation from layer 3 to layer 0 of a four-layer optical disk in the reproduction system of FIG. 1;

FIG. 22 is a block diagram of a circuit for producing a switching signal for switching the focus servo from OFF to ON;

DETAILED DESCRIPTION OF THE INVENTION

Figure 1:
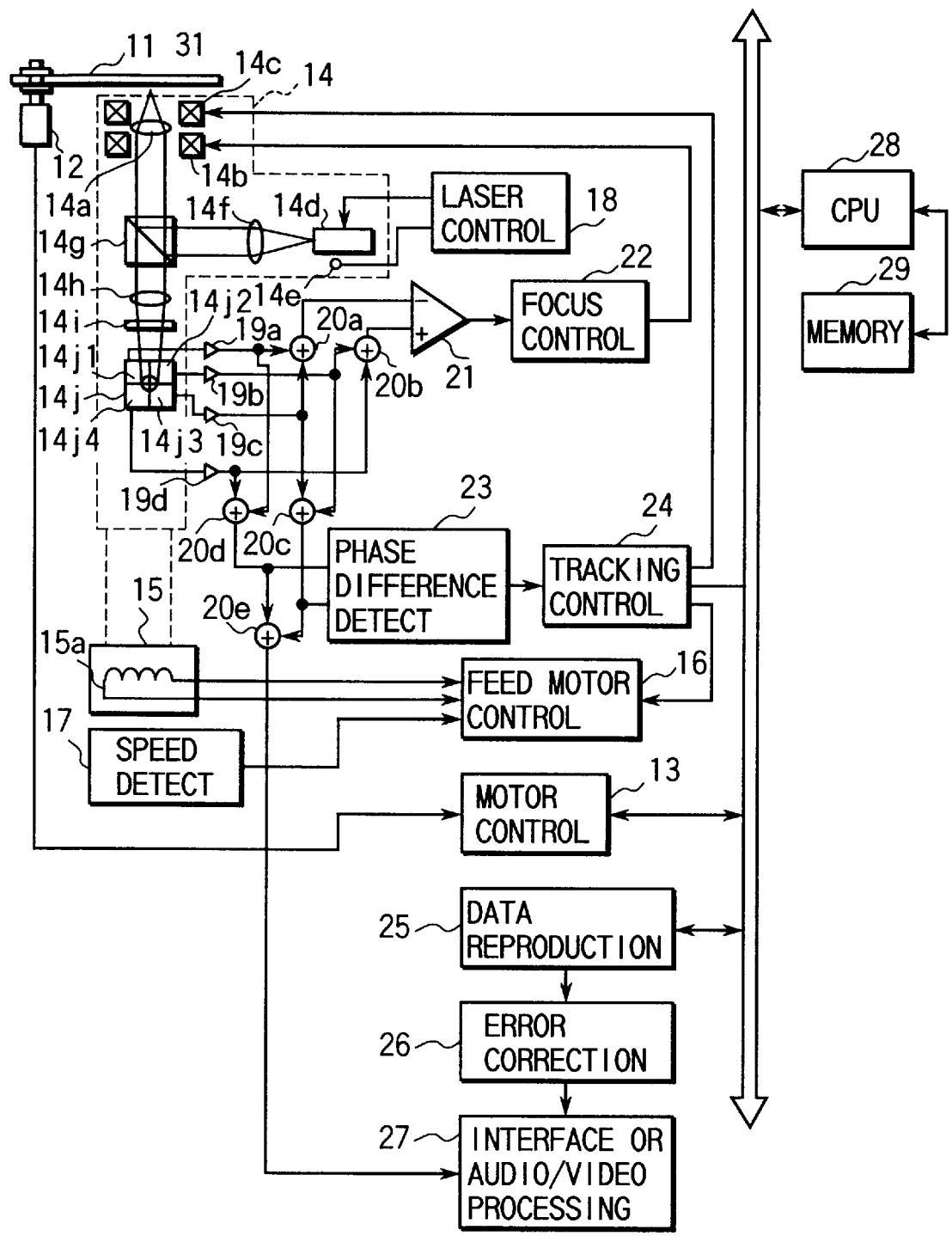
FIG. 1 is a block diagram of a first embodiment of a focus control device for use in a multilayer optical disk reproduction system in accordance with the present invention.

Referring now to FIG. 1, there is illustrated a multilayer optical disk reproduction system, which is adapted to direct a laser beam onto the information side of an optical disk 11, such as a DVD, which is 12 cm in diameter, thereby reading data recorded on the disk.

The optical disk 11 is formed by sticking together two disks each with a signal recorded layer into two-layer structure. Each signal recorded layer of the optical disk is formed with tracks (grooves) in concentric or spiral form. The tracks of the two disks are recorded with a total of about 8.5 gigabytes of data.

Figure 2:
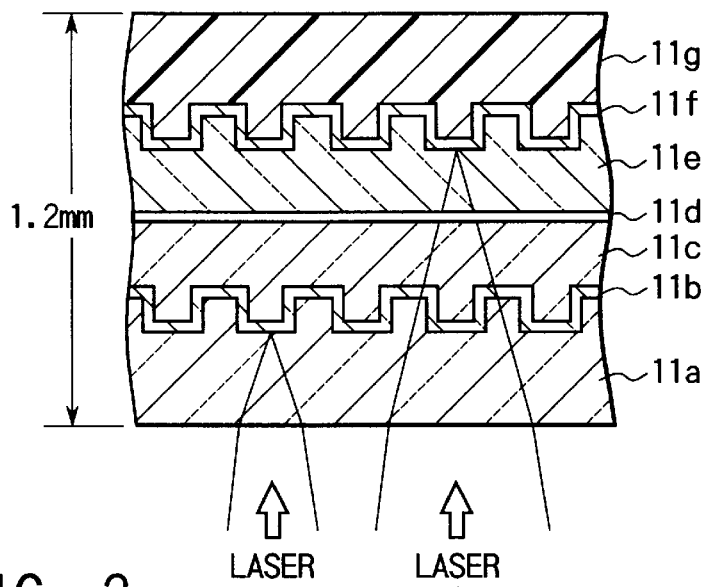
FIG. 2 is a fragmentary sectional view along the direction of tracks of a two-layer optical disk used in the first embodiment.

As shown in FIG. 2, the optical disk 11 uses a semi-transparent reflecting film having a reflectance of 25 to 40% for the signal recorded layer (the first layer) of the lower disk in the figure and a total reflection film having a reflectance of 70% or more for the signal recorded layer (the second layer) of the upper disk. The optical disk 11 is formed by sticking the two signal recorded layers together with precision through the use of an ultraviolet hardened resin. Recorded data is retrieved from each signal recorded layer by directing a laser beam from below in the figure onto the lower side of the optical disk so that the beam is selectively focused onto each signal recorded layer.

The optical disk 11 consists, as shown in FIG. 2, of a stack of a polycarbonate layer (substrate) 11a, a first signal recorded layer (semitransparent layer; layer 0) 11b, a protection layer 11c, an ultraviolet hardened resin layer (adhesive) 11d, a protection layer lie, a second signal recorded layer (reflecting layer; layer 1) 11f, and a polycarbonate layer (substrate) 11g. The spacing between layers 0 and 1 is set to 55±15 micrometers.

Figure 3:
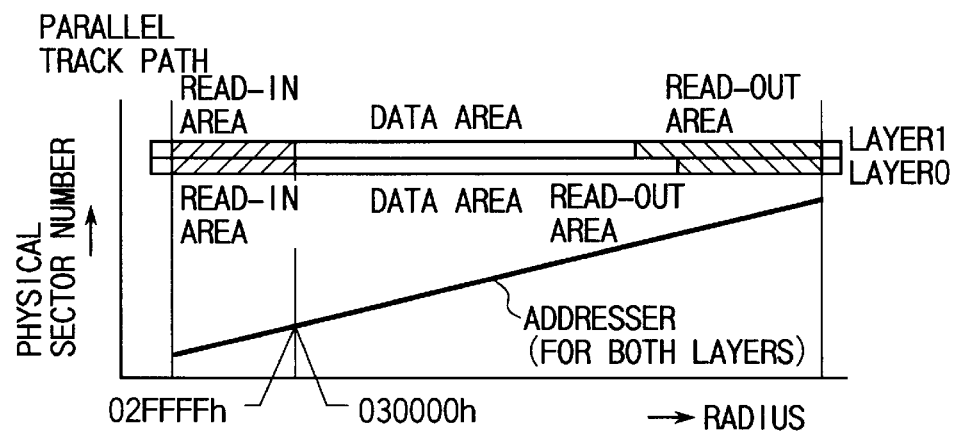
FIG. 3 is a diagram for use in explanation of an example of a data record area on each layer of the two-layer optical disk of FIG. 2.
Figure 4:
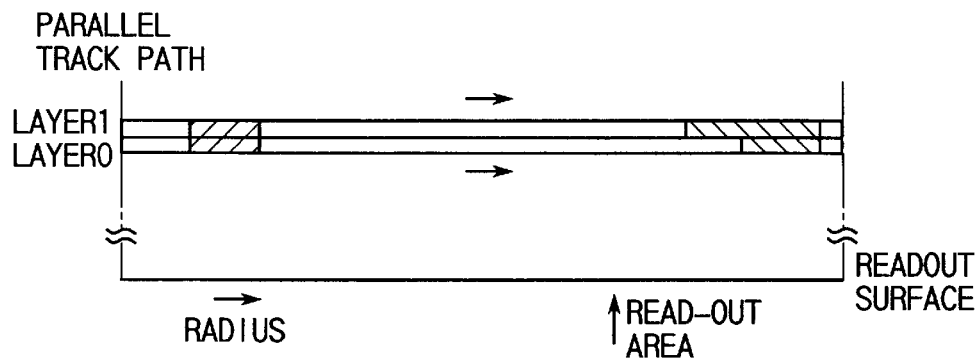
FIG. 4 is a diagram for use in explanation of an example of a reproducing method for the two-layer optical disk of FIG. 2.

Here, types of two-layer optical disks and reproduction methods therefor will be described. In the case of an optical disk shown in FIG. 3, each of layers 0 and 1 has a read-in area (22.6 to 24 mm from the center) on the inside of the disk, a read-out area on the outside, and a data area between the read-in and read-out areas. For both layers 0 and 1, addresses are set up so that they progressively ascend with increasing distance from the innermost track of the disk.

Thus, data are reproduced from each of layers 0 and 1 by shifting laser light outward from the innermost track as the disk rotates. That is, data reproduction starts at the inside read-in area and then alternate data reproduction from layers 0 and 1 proceeds. This reproduction system is called a parallel track path system.

Figure 5:
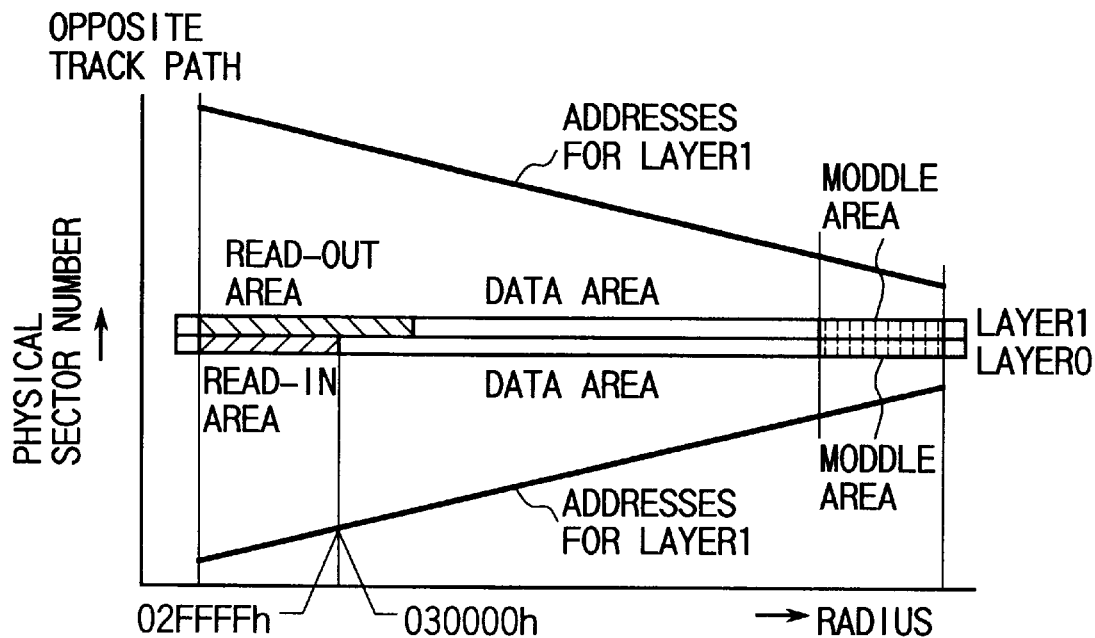
FIG. 5 is a diagram for use in explanation of another example of a data record area on each layer of the two-layer optical disk of FIG. 2.

In the case of an optical disk shown in FIG. 5, layer 0 has a read-in area on the inside of the disk, a middle area on the outside, and a data area between the read-in and middle areas. On the other hand, layer 1 has a read-out area on the inside of the disk, a middle area on the outside, and a data area between the read-out and middle areas. For layer 0, addresses are set up so that they progressively ascend with increasing distance from the innermost track. For layer 1, addresses are set up so that they progressively ascend with increasing distance from the outermost track.

Figure 6:
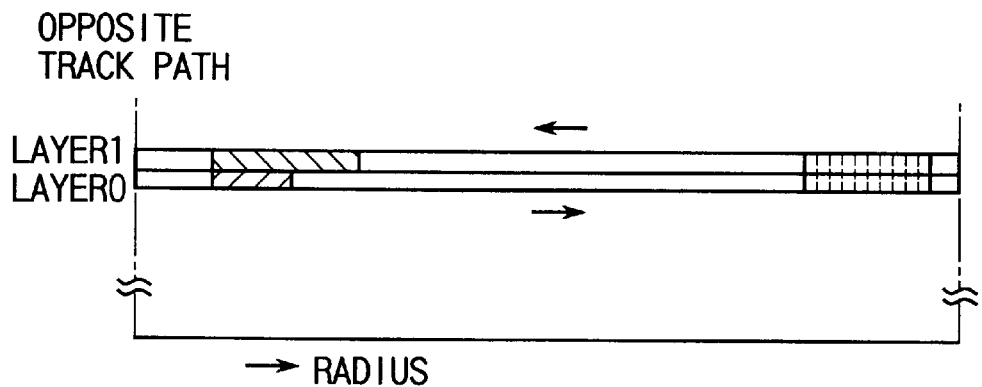
FIG. 6 is a diagram for use in explanation of another example of a reproducing method for the two-layer optical disk of FIG. 2.

Thus, as shown in FIG. 6, data reproduction from layer 0 is performed while laser light is being shifted from the innermost track toward the outermost track as the disk rotates, whereas data reproduction from layer 1 is performed while laser light is being shifted from the outermost track toward the innermost track. That is, the data playback method, called the opposite track path method, is performed by which data reproduction from layer 0 is first performed starting with the innermost track and ending with the outermost track and then data reproduction from layer 1 is performed starting with the outermost track and ending with the innermost track.

Figure 7:
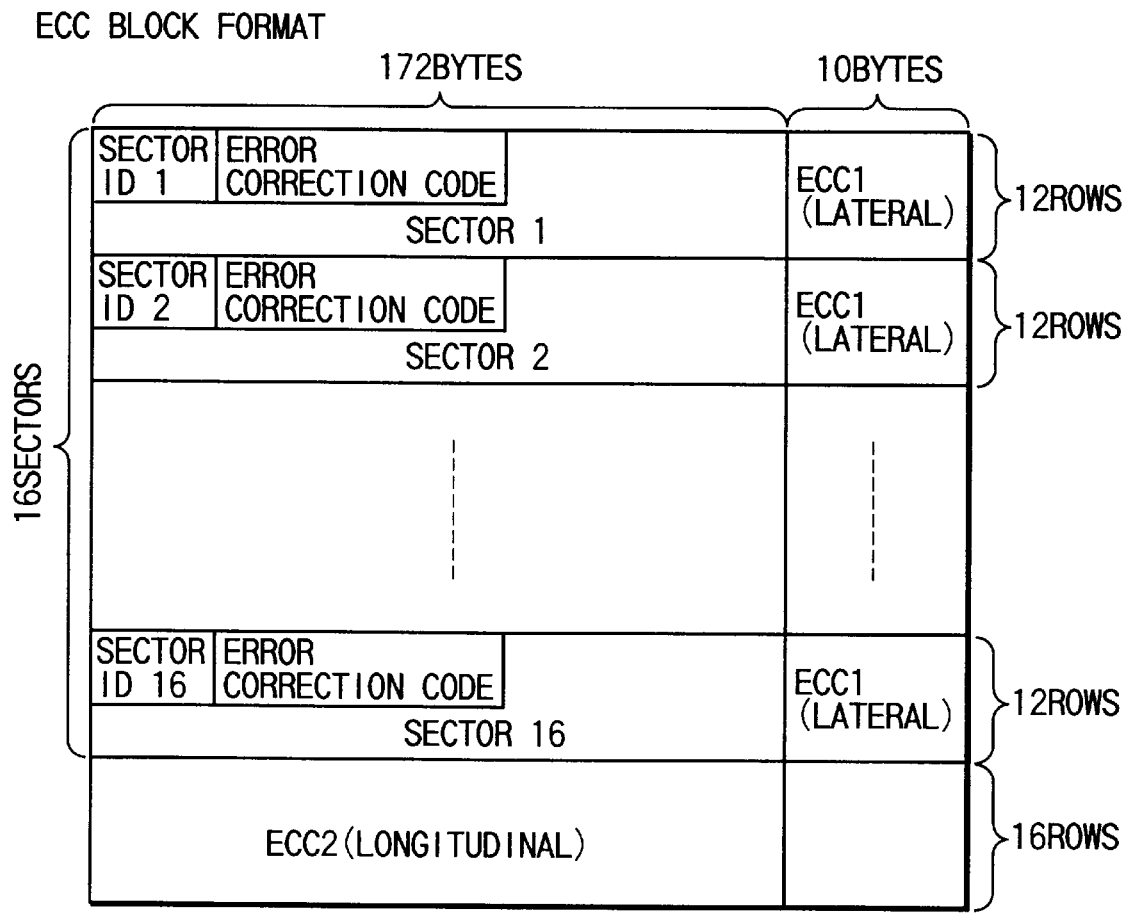
FIG. 7 is a diagram for use in explanation of an ECC block data format.

On the tracks of the optical disk 11 data have been recorded in ECC (Error Correction Code) block units (e.g., in units of 38,688 bytes). Each ECC block is comprised, as shown in FIG. 7, of 16 sectors each of which is recorded with 2 kilobytes of data. In each sector, a 4-byte (32-bit) sector ID (identification data) 1 to ID16, serving as address data, is appended to main data together with a 2-bit error detection code (IED: ID Error Detection Code).

In each ECC block, lateral ECC1 and longitudinal ECC2 are recorded, which serve as error correction codes for reproducing data recorded in the block. The ECC1 and ECC2 are appended as redundant words to data for the purpose of preventing flaws in an optical disk from disabling data reproduction.

Figure 8:
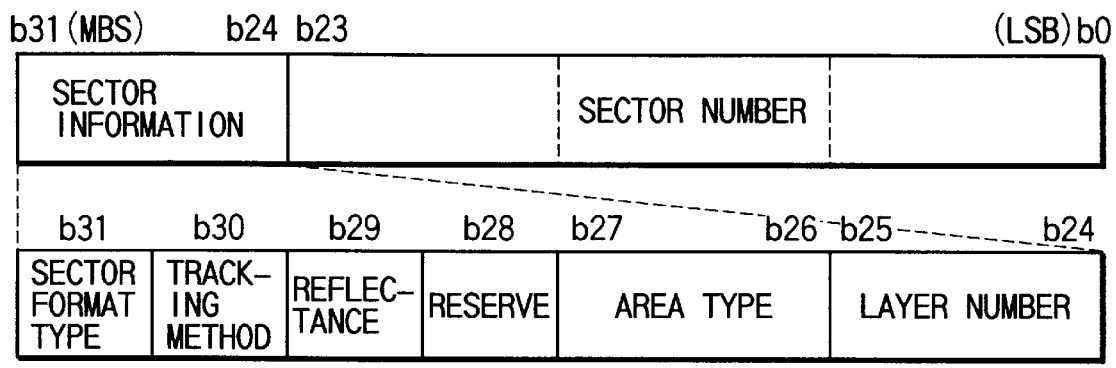
FIG. 8 is a diagram for use in explanation of an ECC block sector ID data format.

The sectors ID1 to ID16 are each comprised, as shown in FIG. 8, of 1-byte (8-bit) sector information and a 3-byte sector number. The sector information is comprised of one bit of data indicating a sector format type, one bit of data indicating a tracking method, one bit of data indicating reflectance, one bit of data indicating a reserve area, two bits of data indicating an area type, and two bits of data indicating a layer number.

The sector format type indicating data indicates the read-only type when it is a 0. The tracking method indicating data indicates the bit tracking when it is a 0. The reflectance indicating data indicates a reflectance of more than 50% when it is a 0 or a reflectance of 50% or less when it is a 1.

The area type indicating data indicates the data area when it is 00, the read-in area when it is 01, the read-out area when it is 10, and the middle area when it is 11. The layer number indicating data indicates layer 0 when it is 00, and layer 1 when it is 01.

Each sector consists of 12 rows of 172 bytes each. To each sector is appended a lateral error correction code ECC1 of 10 bytes for each row and a longitudinal error correction code ECC2 of 182 bytes corresponding to one row.

Figure 9:
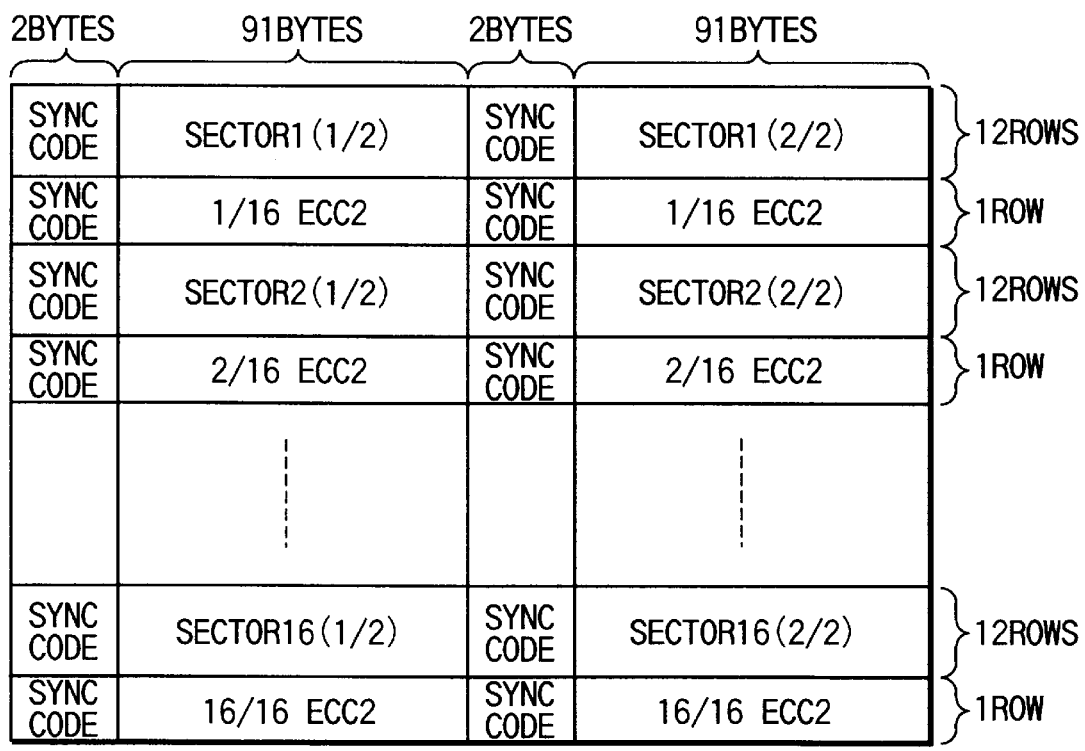
FIG. 9 is a diagram for use in explanation of a data format used in recording the ECC blocks on the optical disk.

When the ECC blocks are recorded on the optical disk 11, 2-byte sync codes are appended, as shown in FIG. 9, to each sector, for example, every 91 bytes for the purpose of establishing byte synchronization during data reproduction.

Each sector is recorded with 2048-bit back data in the MPEG (Moving Picture Image Coding Experts Group) 2 system layer or the like. The back data contains main video data as moving picture data, sub-video data, and audio data.

Referring back to FIG. 1, the optical disk 11 is driven by a disk motor 12 to rotate at a given speed. The disk motor 12 is controlled by a motor control circuit 13. Data are recorded on the optical disk at a linear velocity of 3.84 m/s. When diskreproduction is performed from the inside position 24 mm spaced away from the disk center to the outside position 58 mm spaced away from the disk center, the disk is controlled so that its rotational speed is 26.5 rotations per second at the inside position and 10.5 rotations per second at the outside position.

Data readout from the optical disk 11 is performed by an optical pickup 14, which is moved by a feed motor 15 in the direction of radius of the disk. A driving coil 15a of the feed motor 15 is connected to a feed motor control circuit 16.

The rotational speed of the feed motor 15 is detected by a speed detector 17, which applies a speed detect signal to the feed motor control circuit 16.

The optical pickup 14 has an objective lens 14a, which is supported movably in focusing directions (the direction of the optical axis) and in tracking directions (the direction of radius of the disk). When a control signal is applied to a focusing coil 14b, the objective lens 14a is controlled to move in a focusing direction. When a control signal is applied to a tracking coil 14c, on the other hand, the objective lens is controlled to move in a tracking direction.

A laser control circuit 18 drives a semiconductor laser oscillator 14d within the optical pickup 14 to emit a beam of laser light. The laser oscillator 14d is controlled to emit a given amount of laser light by detecting the amount of emitted laser light by a light amount detector 14e and feeding back the result to the laser control circuit 18.

The laser light emitted by the semiconductor laser oscillator 14d passes through a collimator lens 14f, is bent through 90 degrees by a half prism 14g, and is focused by the objective lens 14a onto either of the signal recorded layers 11b and 11f. Reflected light from the optical disk 11 passes through the objective lens 14a and the half prism 14g and then enters a photoelectric converter 14j through a condenser lens 14h and a cylindrical lens 14i.

The photoelectric converter 14j comprises four photodetectors 14j1, 14j2, 14j3 and 14j4 each of which produces an electric signal the magnitude of which corresponds to the amount of light received. The direction in which the photodetectors 14j1 and 14j2 (14j3 and 14j4) are arranged coincides with the tracking direction for the optical disk 11, and the direction in which the photodetectors 14j1 and 14j4 (14j2 and 14j3) are arranged coincides with the direction of a tangent to the optical disk.

An electric signal output from the photodetector 14j1 of the photoelectric converter 14j is amplified by an amplifier 19a, then applied to one input of each of adders 20a and 20d. An electric signal output from the photodetector 14j2 is amplified by an amplifier 19b, then applied to one input of each of adders 20b and 20c. An electric signal output from the photodetector 14j3 is amplified by an amplifier 19c, then applied to one input of each of adders 20a and 20c. An electric signal output from the photodetector 14j4 is amplified by an amplifier 19d, then applied to one input of each of adders 20b and 20d.

An output signal of the adder 20a is applied to the inverting input of a differential amplifier 21. An output signal of the adder 20b is applied to the noninverting input of the differential amplifier 21. The differential amplifier 21 produces a focus error signal which is a function of the difference between the output signals of the adders 20a and 20b, which is then applied to a focus control circuit 22. This focus control circuit 22 produces a control signal which drives the focusing coil 14b so that the input focus error signal may go to the 0 level. In this manner, the objective lens 14a is subjected to focus servo.

Figure 10:
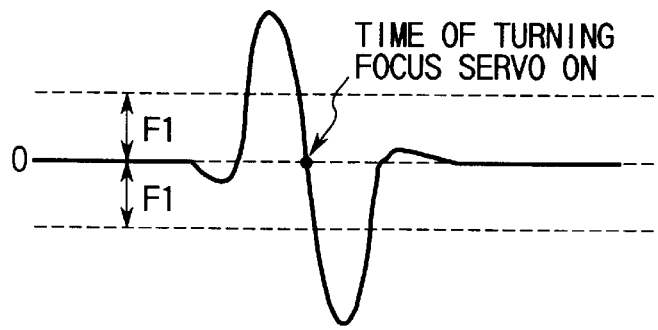
FIG. 10 shows a waveform of a focus error signal at the time of a focus search operation.

When the objective lens 14a is moved from its initial position in a focusing direction for focus search processing, the focus error signal from the differential amplifier 21 will exhibit such an S-shaped characteristic as shown in FIG. 10 as the point onto which the laser light is focused by the objective lens 14a passes through the first signal recorded layer (layer 0).

Thus, the focus search processing for layer 0 is terminated by turning the focus servo ON (turning ON a switch 22a to be described later) at the time when the focus error signal first reaches the 0 level (the center level for focus servo operation) after exceeding a predetermined reference level F1.

When a layer jump is made from layer 0 to layer 1, the focus error signal output from the differential amplifier 21 will exhibit such an S-shaped characteristic as shown in FIG. 11A. Thus, the layer jump will be made from layer 0 to layer 1 by turning the focus servo ON (turning ON the switch 22a) at the time when the focus error signal first reaches the 0 level (the center level for focus servo operation) after exceeding a reference level F1 by the peak in the second half of the S-shaped characteristic.

FIG. 11B shows the result of comparison in magnitude between the focus error signal and the reference voltage F1. FIG. 11C shows the result of comparison in magnitude between the focus error signal and the 0 level. FIG. 11D shows a kick control pulse produced when a request is made for a layer jump from layer 0 to layer 1. FIG. 11E shows a kick pulse applied to the focusing coil 14b. FIG. 11F shows the position of the objective lens 14a when a jump is made from layer 0 to layer 1.

When a layer jump is made from layer 1 to layer 0, the focus error signal output from the differential amplifier 21 will exhibit such an S-shaped characteristic as shown in FIG. 12A. Thus, the layer jump will be made from layer 1 to layer 0 by turning the focus servo ON (turning ON the switch 22a) at the time when the focus error signal first reaches the 0 level (the center level for focus servo operation) after exceeding a reference level F1 by the peak in the second half of the S-shaped characteristic.

FIG. 12B shows the result of comparison in magnitude between the focus error signal and the reference voltage F1. FIG. 12C shows the result of comparison in magnitude between the focus error signal and the 0 level. FIG. 12D shows a kick control pulse produced when a request is made for a layer jump from layer 1 to layer 0. FIG. 12E shows a kick pulse applied to the focusing coil 14b. FIG. 12F shows the position of the objective lens 14a during the layer jump from layer 1 to layer 0.

In FIG. 1, a phase difference detector 23 produces a tracking error signal the magnitude of which is a function of the phase difference between the output signals of the adders 20c and 20d, which is then applied to a tracking control circuit 24. This tracking control circuit produces a control signal for the tracking coil 14c in response to application thereto of the tracking error signal. The tracking error signal used in the tracking control circuit 24 is also applied to the feed motor control circuit 16.

An output signal of an adder 20e connected to receive the output signals of the respective adders 20c and 20d, i.e., the electric signals output from the respective photodetectors of the photoelectric converter 14j, reflects variations in reflected light from pits (data are recorded in the form of pits) formed on a track (or land).

The output signal of the adder 20e is applied to a data reproduction circuit 25, which reads the sector ID of a sector that is currently being accessed from the input signal and performs reproduction processing on data in an ECC block containing the sector ID indicating that data is to be reproduced.

Data reproduced in the data reproduction circuit 25 is applied to an error correction circuit 26, which makes error correction on the input data using the error correction codes ECC1 and ECC2 appended to it and then outputs reproduced data for one sector corresponding to the sector ID for data reproduction to outside via an interface circuit or audio/video processing circuit 27.

In a state in which the objective lens 14a is being moved in a tracking direction under control of the tracking control circuit 24, the feed motor control circuit 16 controls the position of the optical pickup 14 so that the objective lens will be located substantially at the center of the range over which it is movable in the tracking direction within the optical pickup.

The laser control circuit 18, the focus control circuit 22, the tracking control circuit 24, the feed motor control circuit 16 and the motor control circuit 13 are controlled by a central processing unit (CPU) 28, which runs programs stored in a memory 29 to carry out specific operations.

The data reproduction circuit 25 is constructed, as shown in FIG. 13, from a comparator 25a, an ECC block sync code detector 25b, a data readout circuit 25c, and a sector ID readout circuit 25d.

The comparator 25a slices the output signal of the adder 20e corresponding to the sum of the output signals of the respective photodetectors 14j1 to 14j4 of the photoelectric converter 14, i.e., the signal representing variations in reflectance of pits formed on a track, at a reference level to thereby form a two-valued signal. The two-valued signal is then applied to the ECC block sync code detector 25b, the data readout circuit 25c, and the sector ID readout circuit 25d.

The ECC block sync code detector 25b detects from the input two-valued signal ECC block sync codes by the number of bytes corresponding to ECC blocks. A detect signal output from the ECC block sync code detector 25b is applied to the data readout circuit 25c and the sector ID readout circuit 25d.

Each time a detect signal for a sync code is received from the ECC block sync code detector 25b, the data readout circuit 25c reads 91-byte data that follows that sync code as reproduced data. The reproduced data from the data readout circuit 25c issubjected to demodulation, which is the inverse of modulation, by a demodulator not shown and then applied to an error correction circuit 26.

Each time an ECC block sync code is detected by the ECC block sync code detector 25b, the sector ID readout circuit 25d reads data of 6 bytes that follows that sync code as a sector ID containing an error detection code.

When the sector ID is read, the sector ID readout circuit 25d makes a decision as to whether or not there is an error in the read data on the basis of the error detection code. When there is no error, the circuit 25d outputs to the CPU 28 the sector information (including the layer number) and the sector number in the sector ID as the readout results.

Figure 14:
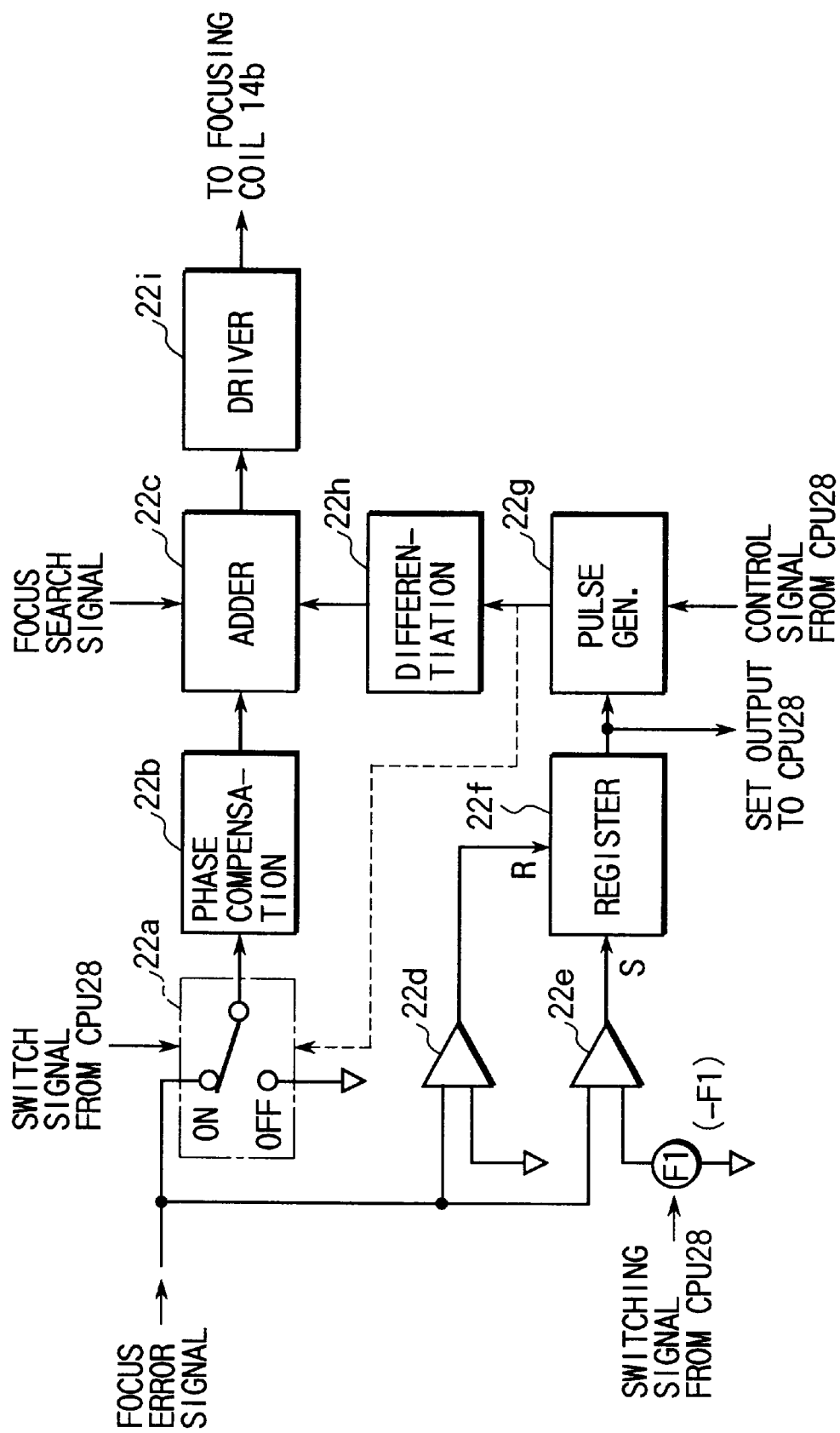
FIG. 14 is a detailed block diagram of the focus control circuit of FIG. 1.

The focus control circuit 22 is constructed, as shown in FIG. 14, from a changeover switch 22a, an adder 22c, voltage comparators 22d and 22e, a register 22f, a pulse generator 22g, a differentiation circuit 22h, and a driver circuit 22i.

The switch 22a is controlled by a kick control pulse generated by the pulse generator 22g. It is placed in the OFF position while it is supplied with the kick control pulse. A switching signal produced by the CPU 28 at the focus search time places the switch 22a to the OFF position.

When the switch 22a is in the ON position, a focus error signal output from the differential amplifier 21 is applied to the phase compensation circuit 22b. When the switch 22a is in the OFF position, on the other hand, no focus error signal is applied to the phase compensation circuit 22b.

The phase compensation circuit 22b subjects the focus error signal input thereinto through the switch 22a to such phase compensation processing as increases the gain for a specific frequency band or advances the phase and provides the resulting signal to an input of the adder 22c. The adder 22c adds the focus error signal from the phase compensation circuit 22b, a kick pulse formed by differentiating a kick control pulse generated by the pulse generator 22g, and a focus search signal generated by the CPU 28 at the focus search time and then provides its output signal to the driver circuit 22i.

The voltage comparator 22d makes a comparison between the focus error signal output from the differential amplifier 21 and the 0 level (the center level for focus servo operation) to produce such pulses as shown in FIGS. 11C and 12C when the focus error signal is at the 0 level. These pulses are then applied to the register 22f as reset pulses.

The voltage comparator 22e makes a comparison between the focus error signal output from the differential amplifier 21 and the reference voltage +F1 or –F1 to produce such a pulse as shown in FIGS. 11B and 12B when the focus error signal exceeds the reference voltage. The pulse is then applied to the register 22f as a set pulse.

In this case, which of the reference voltages +F1 and –F1 is to be used is determined by the CPU 28 which provides a switching signal to select between sources of the reference voltages. When a layer jump is made from layer 0 to layer 1, the reference voltage +F1 is selected. For a layer jump from layer 1 to layer 0, on the other hand, the reference voltage –F1 is selected.

The register 22f is set by the set signal from the voltage comparator 22e and reset by the reset signal from the voltage comparator 22d. Its set output is applied to the pulse generator 22g and the CPU 28.

The pulse generator 22g is responsive to a control signal output by the CPU 28 to switch between the layers and a set output signal of the register 22f to produce such a kick control pulse as shown in FIGS. 11D and 12D. The kick control pulse is then applied to the differentiation circuit 22h.

When a layer jump is made from layer 0 to layer 1, the pulse generator 22g is responsive to a control signal from the CPU 28 to cause the kick control pulse to rise and responsive to the register 22f being reset after it has been set to cause the pulse to fall, as shown in FIG. 11D.

On the other hand, when a layer jump is made from layer 1 to layer 0, the pulse generator 22g responds to a control signal from the CPU 28 to cause the kick control pulse to fall and responds to the register 22f being reset after it has been set to cause the pulse to rise, as shown in FIG. 12D.

The differentiation circuit 22h is responsive to the kick control pulse from the pulse generator 22g to produce such a kick pulse as shown in FIGS. 11E and 12E, which is then applied to the adder 22c. The driver circuit 22i drives the focusing coil 14b in accordance with the sum of the focus error signal and the kick pulse to thereby move the objective lens 14a in a focusing direction.

Figure 15:
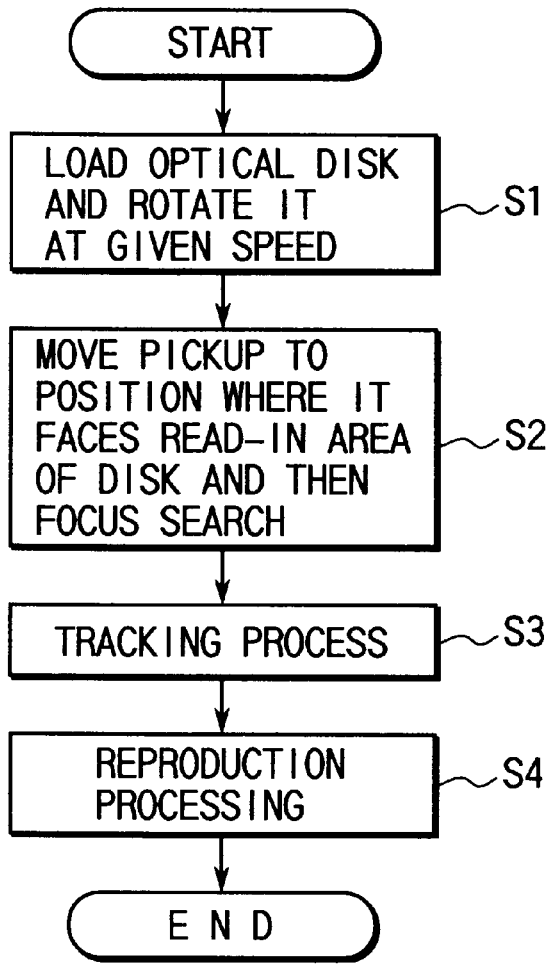
FIG. 15 is a flowchart for the operation of the reproduction system of FIG. 1 starting with loading of an optical disk thereinto.

Reference is now made to a flowchart illustrated in FIG. 15 to describe the procedure when the optical disk 11 is loaded. When the disk is first loaded, the CPU 28 controls the disk motor 12 through the motor control circuit 13 so that the optical disk 11 may spin at a given rotational speed (step S1).

The CPU 28 then moves the optical pickup 14 to its initial position, i.e., the position where it faces the read-in area on the inside of the disk and then performs focus search processing (step S2). In this case, since the read-in area position is determined in advance, a mechanical switch can be used to detect that the optical pickup has arrived at the position where it faces the read-in area.

For the focus search processing, the CPU 28 drives the semiconductor laser oscillator 14d inside the optical pickup 14 through the laser control circuit 18 and outputs a focus search signal to the adder 22c in the focus control circuit 22. As a result, the objective lens 14a is forced to move gradually from its initial position toward the optical disk 11.

At the same time, a laser beam emitted from the semiconductor laser oscillator 14d is focused onto the optical disk 11 through the collimator lens 14f, the half prism 14g, and the objective lens 14a. Reflected light from the optical disk enters the photoelectric converter 14j through the objective lens 14a, the half prism 14g, the condenser lens 14h, and the cylindrical lens 14i.

As a result, the differential amplifier 21 produces a focus error signal from the difference between the sum of output signals of the photodetectors 14j1 and 14j3 in the photoelectric converter 14j and the sum of output signals of the photodetectors 14j2 and 14j4. The focus error signal is then applied to the focus control circuit 22.

Figure 16:
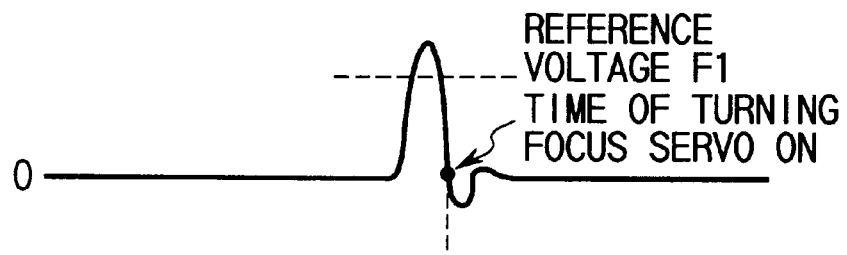
FIG. 16 is a waveform of a focus error signal when a layer jump is made in the reproduction system of FIG. 1.

The focus error signal output from the differential amplifier 21 varies as shown in FIG. 16 as the focal point of the objective lens 14a transits the first signal recorded layer (layer 0) 11b. The focus search processing for the layer 0 is made by turning the focus servo ON (turning the switch 22a ON) at the time when the focus error signal reaches the 0 level after it exceeded the reference voltage F1.

The focus servo is turned ON by the switch 22a being placed in the ON position by setting the register 22f when the focus error signal exceeds the reference voltage F1 and then resetting the register when the focus error signal reaches the 0 level. As a result, the objective lens 14a is kept in the position where the objective lens is allowed to focus on layer 0.

After the focus search has been made, the phase difference detector 23 detects the phase difference between the sum of output signals of the photodetectors 14j1 and 14j4 and the sum of output signals of the photodetectors 14j2 and 14j3. The result is applied to the tracking control circuit 24 as a tracking error signal. Based on the tracking error signal, the tracking control circuit 24 produces a control signal for the tracking coil 14c, whereby tracking servo is performed on the objective lens 14a (step S3). Under the condition in which the tracking servo is performed in this way, information is reproduced from the optical disk (step S4).

Figure 17:
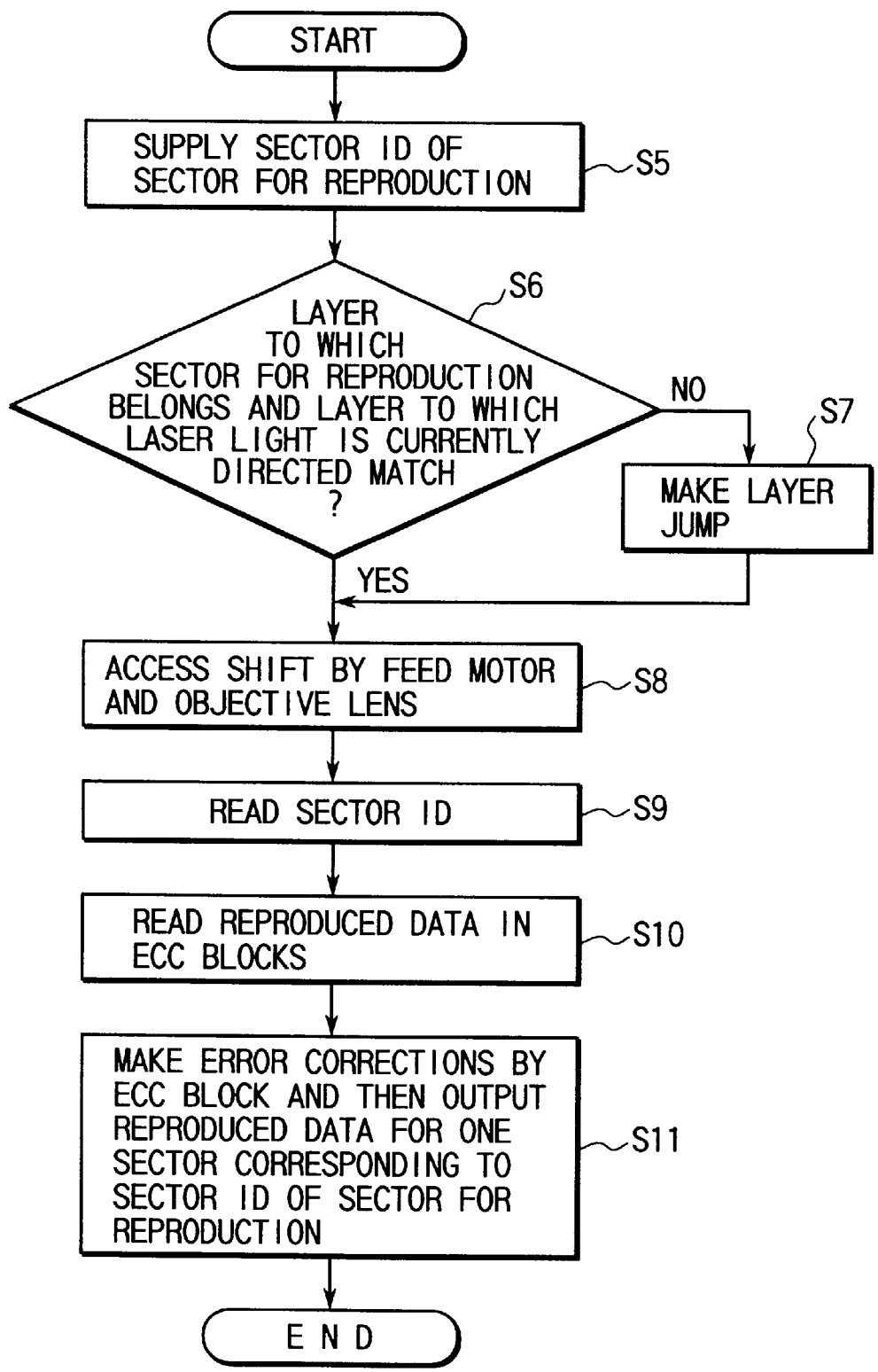
FIG. 17 is a flowchart for the optical disk reproducing operation of the reproduction system of FIG. 1.

The data reproduction processing will be described next with reference to a flowchart illustrated in FIG. 17. When data are reproduced from a certain sector (step S5), the CPU 28 makes a decision as to which of layer 0 and layer 1 that sector belongs to on the basis of its sector ID and then makes a further decision as to whether or not the layer thus decided and the layer to which the laser light is currently directed match (step S6). The layer to which the laser beam is currently directed has been decided at the time of readout of the sector ID to be described later in accordance with the layer number contained in the sector information in the sector ID.

When it is decided that the layers do not match, the CPU 28 makes a layer jump (step S7) and then goes to next step S8. When the layers match, on the other hand, the CPU directly goes to step S8. In this state, data readout signal is two-valued by the comparator 25a in the data reproduction circuit 25 and then applied to the ECC block sync code detector 25b, the data readout circuit 25c, and the sector ID readout circuit 25d.

Each time the ECC block sync code detector 25b detects an ECC block sync code, the sector ID readout circuit 25d reads bytes of data that follows the sync code as a sector ID containing an error detection code. After the sector ID is read, the sector ID readout circuit 25d makes a decision as to whether or not there is an error in the sector ID read. When there is no error, the sector ID is output to the CPU 28 (step S9). In the presence of an error, the sector ID readout circuit 25d skips over that sector ID and reads the next sector ID.

After that, when the sector ID read matches the sector ID to be accessed and the first sector ID in an ECC block containing sector IDs for sectors from which data are to be reproduced is detected, the CPU 28 causes the data readout circuit 22c to read 91 bytes of data that follow a sync code as reproduced data and outputs it to the error correction circuit 26 via the demodulation circuit not shown each time an ECC block sync code is detected by the ECC block sync code detector 22b (step S10).

The error correction circuit 26 makes error corrections by ECC block using the error correction codes ECC1 and ECC2 appended to input reproduced data and then outputs reproduced data for one sector to the audio/video processing circuit 27 (step S11).

Next, a specific operation of making a layer jump will be described with reference to FIGS. 11A through 11F and FIGS. 12A through 12F. When a request is made for a layer jump from layer 0 to layer 1, the CPU 28 places the switch 22a to the OFF position to thereby turn the focus servo for layer 0 OFF. The CPU switches the reference voltage applied to the voltage comparator 22e to +F1 and provides to the pulse generator 22g a control signal for layer jump from layer 0 to layer 1.

The pulse generator 22g then produces a positive-going kick control pulse as shown in FIG. 11D, which is applied to the differentiation circuit 22h. The differentiation circuit differentiates the input kick control pulse to form a kick pulse corresponding to its positive-going edge as shown in FIG. 11E. The kick pulse is then applied to the driver circuit 22i via the adder 22c.

The driver circuit 22i produces a control signal in response to the input kick pulse and applies it to the focusing coil 14b, so that the objective lens 14a is moved so as to shift its focal point from layer 0 to layer 1 as shown in FIG. 11F.

When, as shown in FIG. 11A, the focus error signal output from the differential amplifier 21 goes higher the reference voltage +F1, the voltage comparator 22e sets the register 22f. When, in a state where the register 22f has been set, the focus error signal goes down to the 0 level, the register and the pulse generator 22g are reset.

Thus, the kick control pulse falls as shown in FIG. 11D, thereby placing the switch 22a to the ON position. As a result, the focus error signal from the differential amplifier 21 is fed into the driver circuit 22i, enabling the focus servo with the objective lens 14a placed in position to keep the laser beam in focus on layer 1.

When a request is next made for a jump from layer 1 to layer 0, the CPU 28 places the switch 22a to the OFF position, thereby disabling the focus servo for layer 1. The CPU 28 then switches the reference voltage for the voltage comparator 22e from +F1 to −F1 and outputs a control signal for layer jump from layer 1 to layer 0 to the pulse generator 22g. In this case, the control signal is opposite in polarity to that for layer jump from layer 0 to layer 1.

The pulse generator 22g then produces a negative-going kick control pulse as shown in FIG. 12D, which, in turn, is applied to the differentiation circuit 22h. The differentiation circuit differentiates the input kick control pulse to form a kick pulse corresponding to its negative-going edge as shown in FIG. 12E. The kick pulse is then applied to the driver circuit 22i via the adder 22c.

The driver circuit 22i produces a control signal in response to the input kick pulse and applies it to the focusing coil 14b, so that the objective lens 14a is moved so as to shift its focal point from layer 1 to layer 0 as shown in FIG. 12F.

When, as shown in FIG. 12A, the focus error signal output from the differential amplifier 21 goes lower than the reference voltage −F1, the voltage comparator 22e sets the register 22f. When, in a state where the register 22f has been set, the focus error signal goes to the 0 level, the register and the pulse generator 22g are reset.

Thus, the kick control pulse rises as shown in FIG. 12D, thereby placing the switch 22a to the ON position. As a result, the focus error signal from the differential amplifier 21 is fed into the driver circuit 22i, enabling the focus servo with the objective lens 14a placed in position to keep the laser beam in focus on layer 0.

According to the embodiment described above, in making a layer jump on an optical disk having two signal recorded layers 11b and 11f, a kick pulse is produced and the objective lens 14a is driven in response to the kick pulse with the focus servo kept disabled.

Taking advantage of the S-shaped characteristic of a focus error signal obtained by driving the objective lens 14a, the focus servo is turned ON at the time when the focus servo signal goes back to the 0 level after it exceeded a reference voltage F1, thereby allowing layer jump, i.e., interlayer movement.

For this reason, in making a layer jump on the optical disk having the two signal recorded layers 11b and 11f, it becomes possible to automatically control the position of the objective lens 14a so that the focus servo will be performed rapidly and reliably on a desired signal recorded layer 11b or 11f, allowing information to be easily retrieved from the desired signal recorded layer.

The embodiment was described as using the voltage comparator 22e, the register 22f, the pulse generator 22g, and the differentiating circuit 22h in common for layer jump from layer 0 to layer 1 and layer jump from layer 1 to layer 0. This is merely exemplary and not restrictive. Two independent circuits may be used instead, which differ only in the reference voltage used and its polarity.

The optical disk may be a ROM (Read Only Memory) disk on which data have been recorded in advance or a RAM (Random Access Memory) disk on which data can be recorded. Although the present embodiment was described in terms of an optical disk reproduction system that reproduces data from a multilayer optical disk, the present invention is likewise applicable to the reproducing section of an optical disk recording/reproducing system capable of recording and reproducing data.

Hereinafter, a specific operation of focus search for layer 0 when the objective lens 14a is placed in its initial position will be described with reference to FIGS. 18A, 18B, and 18C. FIG. 18A shows the position of the objective lens 14a, FIG. 18B a focus error signal, and FIG. 18C the result of level comparison between the focus error signal and the reference voltage F1.

When a request is made for a focus search for layer 0 in a state where the objective lens 14a is placed in its initial position, the CPU 28 places the switch 22a to the OFF position, turning the focus servo OFF. Also, the CPU 28 switches the reference voltage applied to the voltage comparator 22e from −F1 to +F1 and produces a focus search signal for causing the objective lens 14a to make a layer jump to layer 0, the focus search signal being applied to the driver circuit 22i via the adder 22c.

The driver circuit 22i then produces a control signal corresponding to the input focus search signal to drive the focusing coil 14b. As a result, the objective lens 14a is moved so that its focal point is shifted from its initial position toward layer 0 as shown in FIG. 18A.

After that, the switch 22a is switched into the ON position at the time when, as shown in FIG. 18B, the focus error signal output from the differential amplifier 21 goes back to the 0 level after it exceeded the reference voltage +F1. Thus, the focus error signal comes to be fed into the driver circuit 22i, enabling the focus servo with the laser light focused by objective lens onto layer 0 as shown in FIG. 18A.

Next, a specific operation of focus search for layer 1 when the objective lens 14a is placed in its initial position will be described with reference to FIGS. 19A, 19B, and 19C. FIG. 19A shows the position of the objective lens 14a, FIG. 19B a focus error signal, and FIG. 19C the result of level comparison between the focus error signal and the reference voltage F1.

When a request is made for a focus search for layer 1 in a state where the objective lens 14a is placed in its initial position, the CPU 28 places the switch 22a to the OFF position, turning the focus servo OFF. Also, the CPU 28 switches the reference voltage applied to the voltage comparator 22e from −F1 to +F1 and produces a focus search signal for causing the objective lens 14a to make a layer jump to layer 1, the focus search signal being applied to the driver circuit 22i via the adder 22c.

The driver circuit 22i then produces a control signal corresponding to the input focus search signal to drive the focusing coil 14b. As a result, the objective lens 14a is moved so that its focal point is shifted from its initial position through layer 0 to layer 1 as shown in FIG. 18A.

After that, the switch 22a is switched into the ON position at the time when, as shown in FIG. 18B, the focus error signal output from the differential amplifier 21 goes back to the 0 level after it exceeded the reference voltage F1 twice, that is, two pulses, each of which, as shown in FIG. 19C, is produced as a result of level comparison between the focus error signal and the reference voltage F1, were counted. Thus, the focus error signal comes to be fed into the driver circuit 22i, enabling the focus servo with the laser light focused by objective lens onto layer 1 as shown in FIG. 19A.

As multilayer optical disks, four-layer optical disks have also been developed in addition to the two-layer optical disks as described so far. In the case of a four-layer optical disk as well, data can be reproduced selectively from its layer 0, 1, 2, or 3 by irradiating its information side with a laser beam and receiving reflected light from the information side.

A specific operation of a layer jump from layer 0 to layer 3 on such a four-layer optical disk will be described with reference to FIGS. 20A, 20B, and 20C. FIG. 20A shows the position of the objective lens 14a, FIG. 20B a focus error signal, and FIG. 20C the result of level comparison between the focus error signal and the reference voltage F1.

When a request is made for a layer jump from layer 0 to layer 3, the CPU 28 places the switch 22a to the OFF position, disabling the focus servo. The CPU 28 switches the reference voltage applied to the voltage comparator 22e from −F1 to +F1 and produces a control signal for causing the objective lens 14a to make a layer jump to layer 3, the control signal being applied to the pulse generator 22g.

In response to application of the control signal, the pulse generator 22g produces a kick control pulse, which, in turn, is converted by the differentiation circuit 22h to a kick pulse. The kick pulse is then applied to the driver circuit 22i through the adder 22c. The driver circuit 22i then produces a control signal corresponding to the input kick pulse, which is applied to the focusing coil 14b. As a result, the objective lens 14a is moved so that its focal point is shifted from layer 0 through layers 1 and 2 to layer 3 as shown in FIG. 20A.

After that, the switch 22a is switched into the ON position at the time when, as shown in FIG. 20B, the focus error signal output from the differential amplifier 21 goes back to the 0 level after it exceeded the reference voltage F1 three times, that is, three output pulses, each of which, as shown in FIG. 20C, is produced as a result of level comparison between the focus error signal and the reference voltage F1, were counted. Thus, the focus error signal comes to be fed into the driver circuit 22i, enabling the focus servo with the laser light focused by objective lens onto layer 3 as shown in FIG. 20A.

A specific operation of a layer jump from layer 3 to layer 0 on the four-layer optical disk will be described with reference to FIGS. 21A, 21B, and 21C. FIG. 21A shows the position of the objective lens 14a, FIG. 21B a focus error signal, and FIG. 21C the result of level comparison between the focus error signal and the reference voltage F1.

When a request is made for a layer jump from layer 3 to layer 1, the CPU 28 places the switch 22a to the OFF position, disabling the focus servo. The CPU 28 switches the reference voltage applied to the voltage comparator 22e from +F1 to −F1 and produces a control signal for causing the objective lens 14a to make a layer jump to layer 0. The control signal is applied to the pulse generator 22g.

In response to application of the control signal, the pulse generator 22g produces a kick control pulse, which, in turn, is converted by the differentiation circuit 22h to a kick pulse. The kick pulse is then applied to the driver circuit 22i through the adder 22c. The driver circuit 22i then produces a control signal corresponding to the input kick pulse, which is applied to the focusing coil 14b. As a result, the objective lens 14a is moved so that its focal point is shifted from layer 3 through layers 2 and 1 to layer 0 as shown in FIG. 21A.

After that, the switch 22a is switched into the ON position at the time when, as shown in FIG. 21B, the focus error signal output from the differential amplifier 21 goes back to the 0 level after it exceeded the reference voltage −F1 three times, that is, three output pulses, each of which, as shown in FIG. 21C, is produced as a result of level comparison between the focus error signal and the reference voltage −F1, were counted. Thus, the focus error signal comes to be fed into the driver circuit 22*i*, enabling the focus servo with the laser light focused by objective lens onto layer 0 as shown in FIG. 21A.

In the layer jump and focus search operations described above, the focus servo is enabled (ON) by counting pulses resulting from level comparison between the focus error signal and the reference voltage F1 up to a predetermined count and then detecting that the focus level signal has reached the 0 level, thereby judging that the focal point of the objective lens has reached a desired signal recorded layer.

Figure 22:
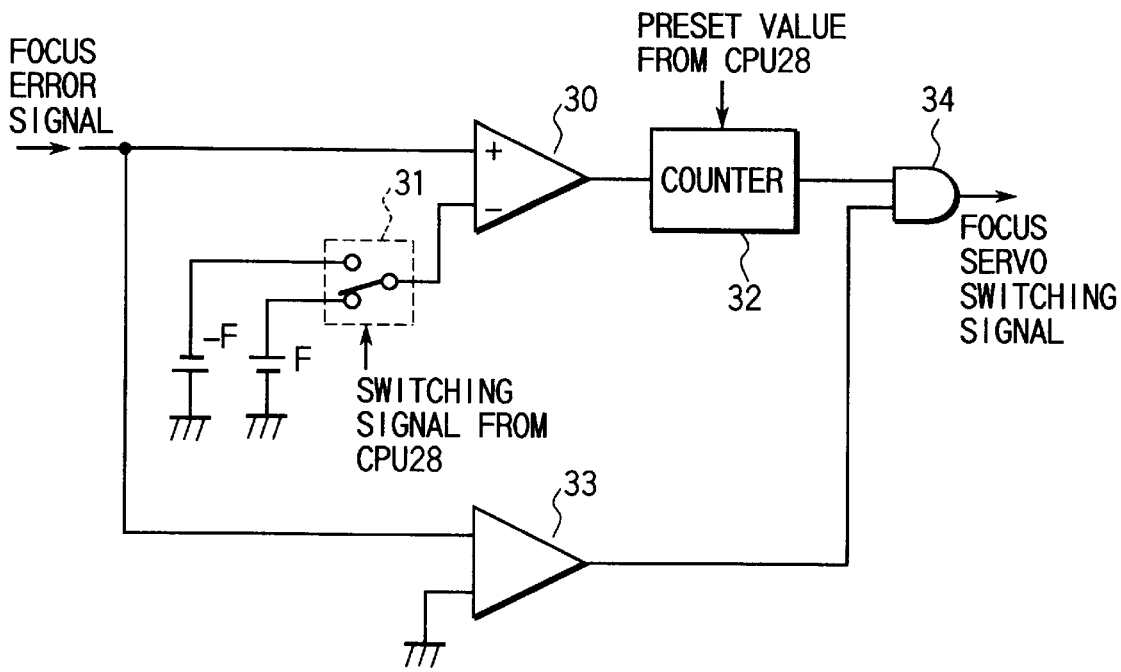

Although the switching signal for switching the focus servo into the ON state is produced by the CPU 28, it may be produced by such a circuit as shown in FIG. 22. That is, the focus error signal output from the differential amplifier 21 is applied to the noninverting input of a level comparator 30, which has its inverting input selectively connected to the reference voltage +F1 or −F1 by a switch 31. This switch 31 is controlled by a switching signal from the CPU 28. The level comparator 30 makes a comparison between the focus error signal and the reference voltage +F1 or −F1 and, each time the focus error signal exceeds the reference voltage, produces such a pulse as shown in FIG. 11B, 12B, 18C, 19C, 20C, or 21C.

Pulses produced by the level comparator 30 are counted by a counter 32. Into this counter has been placed in advance by the CPU 28 the number of signal recorded layers intervening between the current position of the focal point of the objective lens 14*a* and a target signal recorded layer. Upon counting the pulses from the level comparator 30 up to the preset value, the counter produces a signal at an H (high) level.

The focus error signal from the differential amplifier 21 is also compared with the 0 level by a level comparator 33, which produces a signal at the H level when the focus error signal is at the 0 level. The outputs of the comparators 32 and 33 are connected to an AND circuit 34. Thus, the AND circuit 34 will produce a switching signal at the H level when the outputs of the counter 32 and the comparator 33 are both at the H level.

The four-layer optical disks include disks of the so-called double two-layered type, which are formed by sticking two two-layer optical disks together and can store as much as 17 gigabytes of data.

Figure 23:
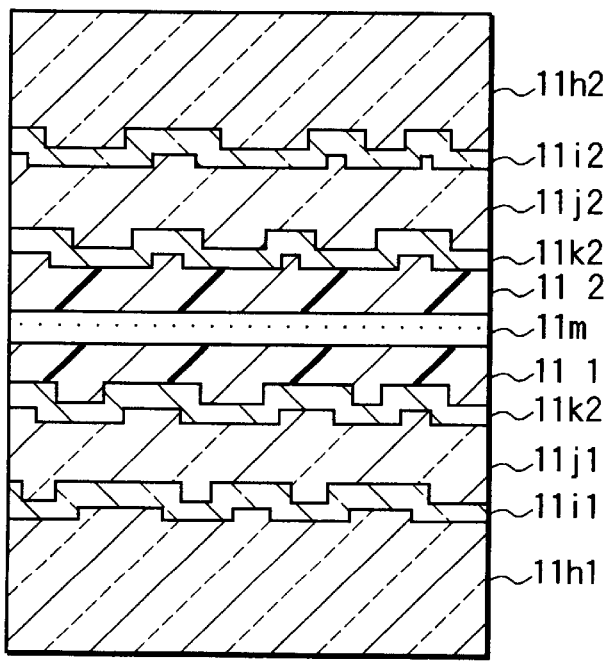
FIG. 23 is a fragmentary sectional view along the direction of tracks of a four-layer optical disk.

An optical disk of the double two-layered type is constructed, as shown in FIG. 23, from a first two-layer optical disk consisting of a polycarbonate layer (substrate) 11*h*1, a first signal recorded layer (semitransparent layer) 11*i*1, an ultraviolet hardened resin 11*j*1, a second signal recorded layer (reflecting layer) 11*k*1, and a protection layer 11*l*1 and a second two-layer optical disk consisting of a polycarbonate layer (substrate) 11*h*2, a first signal recorded layer (semitransparent layer) 11*i*2, an ultraviolet hardened resin 11*j*2, a second signal recorded layer (reflecting layer) 11*k*2, which are stuck together with an adhesive layer 11*m*.

With this type of optical disk, the first and second signal recorded layers 11*i*1 and 11*k*1 can be irradiated with laser light from below in the figure to reproduce data therefrom. On the other hand, the first and second signal recorded layers 11*i*2 and 11*k*2 can be irradiated with laser light from above to reproduce data therefrom.

In this case, the interlayer movement between the first and second layers 11*i*1 and 11*k*1 on the first two-layer disk and the interlayer movement between the first and second layers 11*i*2 and 11*k*2 on the second two-layer disk are performed identically to the interlayer movement between layers 0 and 1 described above.

Next, measures against surface fluctuation of optical disks will be described. It is known that optical disks will fluctuate substantially perpendicularly to the disk surface as they rotate, i.e., so-called surface fluctuation occurs, because of the presence of a distortion or warp in the disk surface.

That is, since an actual optical disk has a slight distortion or warp in the disk surface, the position of the signal recorded layer relative to the optical pickup will periodically change as the disk rotates. For this reason, the position of the objective lens 14*a* is controlled in the focusing direction so as to keep the spacing between the objective lens and the signal recorded layer constant, thereby allowing the laser light to be focused on the fluctuating signal recorded layer. The main frequency components of the surface fluctuation lie in a region of DC (direct current) to low frequencies.

Figure 24A:
FIGS. 24A, 24B and 24C are diagrams for use in explanation of problems that arise from disk warp.
Figure 24B:
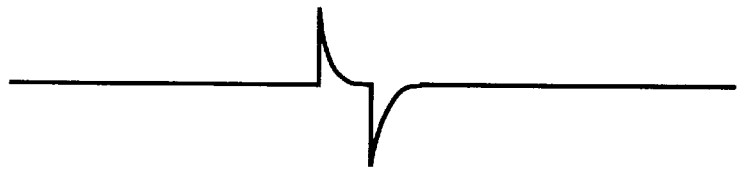

With optical disks having little surface fluctuation, the above-described embodiment allows layer jumps to be achieved successfully. With optical disks having great surface fluctuation (the maximum fluctuation is ±0.3 mm or more), when a kick pulse is produced when the control signal output from the driver circuit 22*i* is deviated from the 0 level (shown at A in FIGS. 24A to 24C) as a result of surface fluctuation, the control signal will shift toward its operation center (for example, 0V). That is to say, when a request is made for a layer jump, such a kick control pulse as shown in FIG. 24A is output from the pulse generator 22*g* and then such a kick pulse as shown in FIG. 22*h* is produced from the differentiation circuit 22*h* and applied to the driver circuit 22*i* via the adder 22*c*. Since the switch 22*a* is in the OFF position during layer jump, no focus error signal is applied to the adder 22*c*.

Figure 24C:
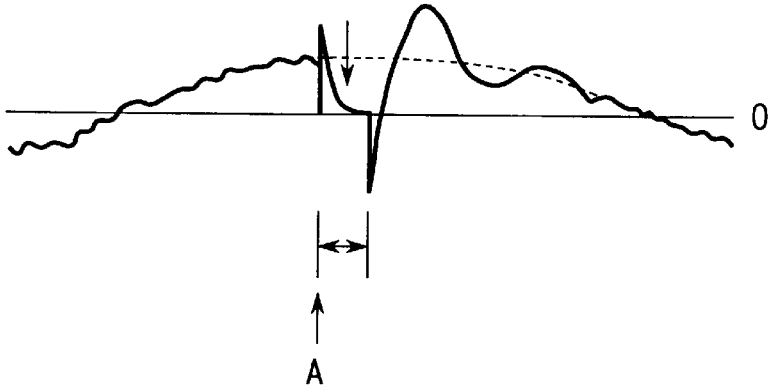

Thus, the control signal output from the driver circuit 22*i* becomes insufficient as shown in FIG. 24C, which results in an increase in the time taken for the objective lens 14*a* to arrive at the position that allows the laser light to be focused onto the target signal recorded layer. A problem may therefore arise in that rapid and reliable layer jumps cannot be made.

Figure 25:
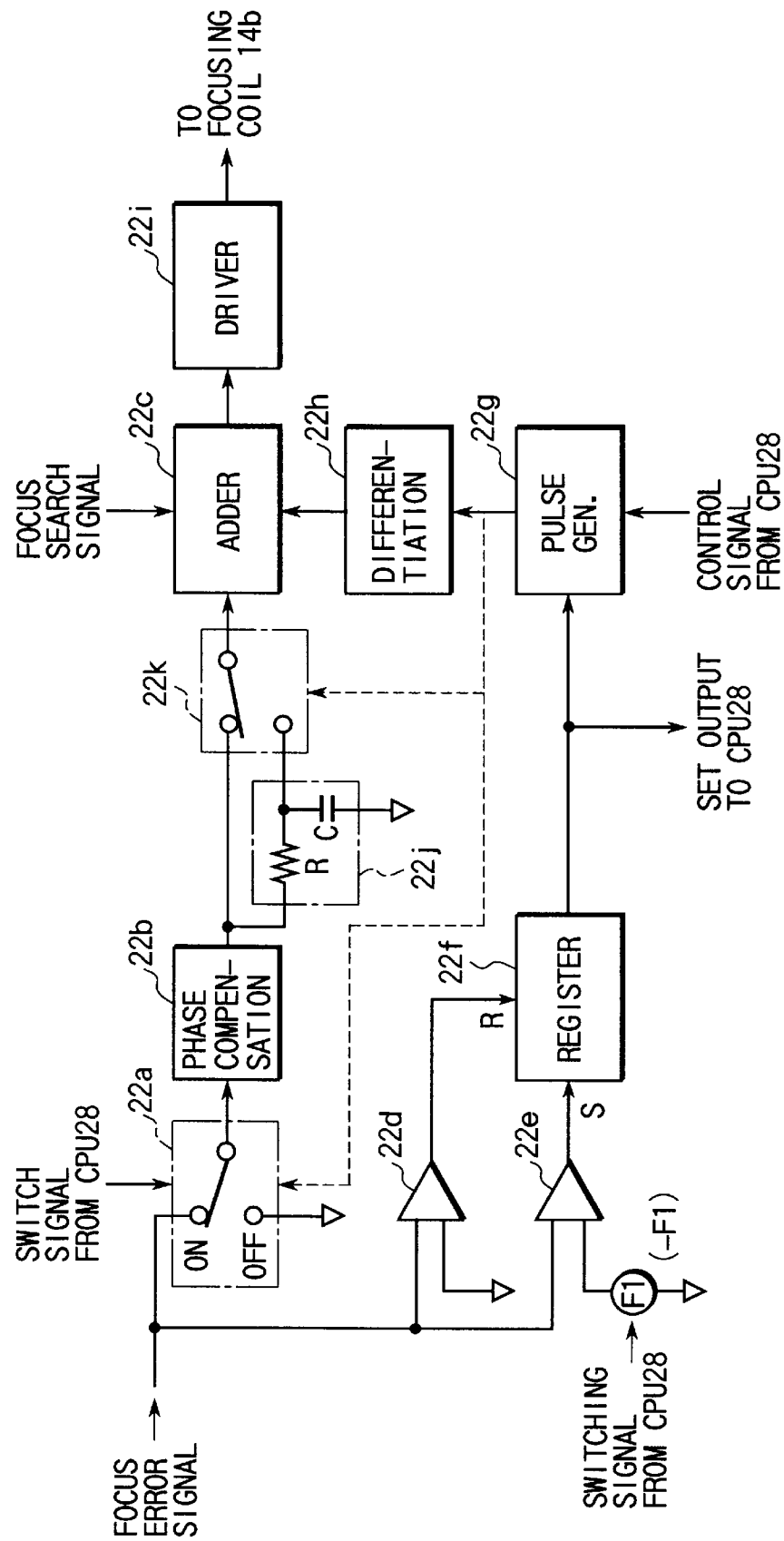
FIG. 25 is a block diagram of a modification of the focus control circuit.

As a measure against the surface fluctuation, as shown in FIG. 25, between the phase compensation circuit and the adder are interposed a hold circuit 22*j* that holds the output of the phase compensation circuit 22*b* in the focus control circuit 22 and a switch 22*k* that selectively applies the output of the hold circuit or the output of the phase compensation circuit to the adder 22*c*.

The hold circuit 22*j*, which is a first-order lowpass filter consisting of a resistor R and a capacitor C, holds DC and low-frequency components of the output of the phase compensation circuit 22*b*. In this case, the hold circuit 22*j* has a function of holding the focus error signal prior to a layer jump by means of the capacitor C and a function of eliminating high-frequency noise components contained in the focus error signal by means of the lowpass filter action.

The switch 22*k* is controlled by the kick control pulse output from the pulse generator 22*g* in synchronism with the switch 22*a*. When the switch 22*a* is in the ON position, the switch 22*k* conducts the output of the phase compensation circuit 22*b* to the adder 22*c*. When the switch 22*a* is in the OFF position, on the other hand, the switch 22*k* conducts the output of the hold circuit 22*j* to the adder 22*c*.

Figure 26A:
FIGS. 26A, 26B and 26C are diagrams for use in explanation of an operation when countermeasures are taken against disk warp.
Figure 26B:

Thus, when a request is made for a layer jump and a kick control pulse therefore rises as shown in FIG. 26A, the hold circuit 22*j* holds DC and low-frequency components of the output of the phase compensation circuit 22*b* immediately prior to the switch 22*a* being placed to the OFF position, these components being applied to the adder 22*c* via the switch 22*k*.

Figure 26C:
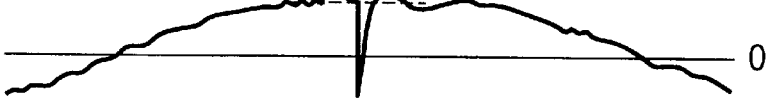

Thus, the driver circuit 22i produces a control signal in which, as shown in FIG. 26C, the DC and low-frequency components held in the hold circuit 22j are superimposed upon the kick pulse output from the differentiation circuit 22h. Layer jumps can therefore be made with provision made against disk surface fluctuation.

That is, although the focus servo is turned OFF during a layer jump, so that the objective lens does not follow the fluctuating disk, the low-frequency components of a focus error signal immediately prior to the layer jump are held by the hold circuit 22j and then superimposed upon a kick pulse.

For this reason, the control signal output from the driver circuit 22i is allowed to have a sufficient level as shown in FIG. 26C. Even with great disk fluctuation, therefore, the objective lens 14a can be moved rapidly and accurately to the position where the objective lens can focus the laser light onto the desired signal recorded layer without its disk fluctuation-following operation being affected greatly. Thus, rapid and reliable layer jumps can be made.

As the time at which the hold circuit 22j holds a focus error signal, any time is not preferable that is more than one quarter of one rotational period of the optical disk ahead of the time of start of a layer jump. This is because there is the possibility that the polarity of the focus error signal may reverse as time elapses. In addition, any time is not preferable that is less than 1/100 of one rotational period of the disk ahead of the time of the start of a layer jump. The reason is that changes due to disk fluctuation are small and noise is dominant.

In order to ensure the reliability of a focus error signal held by the hold circuit 22j, therefore, it is important to average the focus error signal over a range of times that are 1/100 of one rotational period of the disk or more ahead of the time of start of a layer jump.

Moreover, it is desirable that the focus error signal held by the hold circuit 22j be passed through a lowpass filter having a cutoff frequency that is up to 300 times lower than the number of rotations per second of the optical disk to attenuate noise components.

Furthermore, according to the measure against disk fluctuation described above, a control signal that is output from the driver circuit 22i immediately before a layer jump is made has been superimposed with a kick pulse. Thus, the layer jump is made while the objective lens is being driven in the focusing direction, allowing the objective lens to be moved rapidly to the desired position.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

We claim:

1. A focus control device for use in a multilayer optical disk reproduction system comprising:
    an objective lens for focusing a beam of light onto one side of a multilayer optical disk having a stack of multiple signal recorded layers;
    focusing means for moving the objective lens in a focusing direction so that the beam of light will be focused onto one of the signal recorded layers;
    photodetector means for detecting reflected light from a signal recorded layer onto which the beam of light is substantially focused;
    focus error signal producing means responsive to an output signal from the photodetector means for producing a focus error signal representing an out of focus condition of the objective lens on the signal recorded layer;
    focus servo means responsive to the focus error signal produced by the focus error signal producing means for controlling the focusing means to move the objective lens so that the light beam is focused on the signal recorded layer;
    moving means responsive to a movement signal in place of the focus error signal for controlling the focusing means to move the objective lens in a focusing direction;
    layer detecting means for, in a state where the objective lens is being moved by the movement means in a focusing direction, detecting the number of signal recorded layers transited by the focal point of the objective lens on the basis of an S-shaped characteristic of the focus error signal produced by the focus error signal producing means; and
    control means for, when the number of signal recorded layers detected by the layer detecting means reaches a given value and the focus error signal indicates an in-focus value, controlling the focusing means in response to the focus error signal in place of the movement signal.

2. The focus control device according to claim 1, wherein the moving means produces the movement signal when the objective lens is controlled by the focus servo means so that it is focused on a signal recorded layer.

3. The focus control device according to claim 1, wherein the moving means produces the movement signal when the objective lens is placed in its initial position where it is not focused on any one of the signal recorded layers.

4. The focus control device according to claim 1, wherein the layer detecting means counts the number of times the focus error signal exceeds a predetermined reference level.

5. The focus control device according to claim 1, wherein the moving means includes hold means for holding the focus error signal immediately prior to the movement signal being produced in a state where the objective lens is controlled by the focus servo means so that it is focused on a signal recorded layer; and adder means for superimposing the focus error signal held by the hold means on the movement signal to thereby produce a new movement signal by which the focusing means is controlled.

6. A focus control device for use in a multilayer optical disk reproduction system, comprising:
    an objective lens for focusing a beam of light on one side of a multilayer optical disk comprising a plurality of signal recorded layers laid one on another;
    focus servo means for moving said objective lens, thereby causing said objective lens to substantially focus a beam of light on any one of the signal recorded layers;
    lens-moving means for turning off said focus servo means and moving said objective lens in a focusing direction; and
    detecting means for detecting whether a focal point of said objective lens reaches any desired one of said signal recorded layers and turning on said focus servo means upon detecting that the focal point reaches the desired signal recorded layer.

7. For use with a multilayer optical disk reproduction system comprising: an objective lens for focusing a beam of light onto one side of a multilayer optical disk having a stack of multiple signal recorded layers; focusing means for moving the objective lens in a focusing direction so that the beam of light will be focused onto one of the signal recorded layers; photodetector means for detecting reflected light from a signal recorded layer onto which the beam of light is substantially focused; focus error signal producing means responsive to an output signal from the photodetector means for producing a focus error signal representing an out of focus condition of the objective lens on the signal recorded layer; and focus servo means responsive to the focus error signal produced by the focus error signal producing means for controlling the focusing means to move the objective lens so that the light beam is focused on the signal recorded layer, a focus controlling method comprising the steps of:

- controlling the focusing means to move the objective lens in a focusing direction in response to a movement signal in place of the focus error signal;
- detecting the number of signal recorded layers transited by the focal point of the objective lens on the basis of an S-shaped characteristic of the focus error signal produced by the focus error signal producing means in a state where the objective lens is being moved by the moving means in a focusing direction; and
- controlling the focusing means in response to the focus error signal in place of the movement signal when the number of signal recorded layers detected by the layer detecting means reaches a given value and the focus error signal indicates an in-focus value.

8. The focus controlling method according to claim 7, wherein the movement signal is produced when the objective lens is controlled by the focus servo means so that it is focused on a signal recorded layer.

9. The focus controlling method according to claim 7, wherein the movement signal is produced when the objective lens is placed in its initial position where it is not focused on any one of the signal recorded layers.

10. The focus controlling method according to claim 7, wherein the number of signal recorded layers is detected by counting the number of times the focus error signal exceeds a predetermined reference level.

11. The focus controlling method according to claim 7, further comprising the steps of: holding the focus error signal immediately prior to the movement signal being produced in a state where the objective lens is controlled by the focus servo means so that it is focused on a signal recorded layer; and superimposing the focus error signal held by the hold means on the movement signal to thereby produce a new movement signal by which the focusing means is controlled.

* * * * *